US012804710B2

(12) United States Patent
Chien

(10) Patent No.: US 12,804,710 B2
(45) **Date of Patent: *Nov. 17, 2026**

(54) USER EQUIPMENT, BASE STATION, AND CHANNEL ACCESS METHOD

(71) Applicant: PURPLEVINE INNOVATION COMPANY LIMITED, Hong Kong (HK)

(72) Inventor: Chun-Che Chien, Hong Kong (HK)

(73) Assignee: PURPLEVINE INNOVATION COMPANY LIMITED, Hong Kong (CN)

( * ) Notice: Subject to any disclaimer, the term of this patent is extended or adjusted under 35 U.S.C. 154(b) by 348 days.

This patent is subject to a terminal disclaimer.

(21) Appl. No.: 18/559,336

(22) PCT Filed: May 6, 2022

(86) PCT No.: PCT/CN2022/091284

§ 371 (c)(1),
(2) Date: Nov. 6, 2023

(87) PCT Pub. No.: WO2022/233330

PCT Pub. Date: Nov. 10, 2022

(65) Prior Publication Data

US 2024/0237059 A1 Jul. 11, 2024

Related U.S. Application Data

(63) Continuation-in-part of application No. PCT/CN2021/140165, filed on Dec. 21, 2021.

(Continued)

(30) Foreign Application Priority Data

Dec. 21, 2021 (WO) ................ PCT/CN2021/140165

(51) Int. Cl.
*H04W 74/08* (2024.01)
*H04W 72/232* (2023.01)

(52) U.S. Cl.
CPC ......... *H04W 74/08* (2013.01); *H04W 72/232* (2023.01)

(58) Field of Classification Search
CPC . H04W 74/08; H04W 72/232; H04W 74/002; H04W 74/0816
See application file for complete search history.

(56) References Cited

U.S. PATENT DOCUMENTS

2020/0037354 A1* 1/2020 Li ..................... H04W 74/0808
2020/0305191 A1 9/2020 Moon et al.

(Continued)

FOREIGN PATENT DOCUMENTS

CN 111543100 A 8/2020
CN 111601392 A 8/2020

(Continued)

OTHER PUBLICATIONS

International Search Report in International application No. PCT/CN2022/091284,mailed on Jul. 27, 2022.

(Continued)

*Primary Examiner* — Lan-Huong Truong

(74) *Attorney, Agent, or Firm* — PV IP PC; Wei Te Chung

(57) ABSTRACT

A user equipment (UE) executes a channel access method in an unlicensed band. The UE receives from a base station a downlink control information (DCI) within a region of a first fixed frame period (FFP), wherein the DCI is configured to schedule at least one portion of DL data within a region of a second FFP. The UE derives a COT initiator associated with a channel occupancy time (COT) within the region of the second FFP. The UE receives the at least one portion of (Continued)

the scheduled DL data in the channel occupancy time (COT) initialized by the derived initiator according to a reception condition.

20 Claims, 12 Drawing Sheets

Related U.S. Application Data

(60) Provisional application No. 63/185,370, filed on May 7, 2021.

(56) References Cited

U.S. PATENT DOCUMENTS

| | | | | |
|---|---|---|---|---|
| 2020/0314891 | A1 * | 10/2020 | Li | H04W 74/006 |
| 2020/0322988 | A1 | 10/2020 | Fisher-Jeffes et al. | |
| 2020/0396767 | A1 | 12/2020 | Talarico et al. | |
| 2021/0014891 | A1 | 1/2021 | Talarico et al. | |
| 2021/0084683 | A1 * | 3/2021 | Li | H04W 74/0808 |
| 2023/0064829 | A1 * | 3/2023 | Yang | H04W 74/0808 |

FOREIGN PATENT DOCUMENTS

| | | | |
|---|---|---|---|
| CN | 111800887 | A | 10/2020 |
| WO | 2018174550 | A1 | 9/2018 |
| WO | 2020027533 | A1 | 2/2020 |
| WO | 2020032734 | A1 | 2/2020 |
| WO | 2020118720 | A1 | 6/2020 |

OTHER PUBLICATIONS

Written Opinion of the International Search Authority in International application No. PCT/CN2022/091284,mailed on Jul. 27, 2022.

International Search Report in International application No. PCT/CN2021/140165,mailed on Mar. 1, 2022.

Written Opinion of the International Search Authority in International application No. PCT/CN2021/140165,mailed on Mar. 1, 2022.

Ericsson Enhancements for IIoT/URLLC on Unlicensed Band 3GPP TSG-RAN WG1 Meeting #103-e Tdoc R1-2007709 Nov. 13, 2020 (Nov. 13, 2020) section 2.

Spreadtrum Communications Discussion on enhancements for unlicensed band URLLCIIoT 3GPP TSG RAN WG1 #103-e R1-2008108,Nov. 13, 2020 (Nov. 13, 2020), the whole document.

Intel Corporation Further Details on Enabling URLLC/IIoT in Unlicensed Band 3GPP TSG RAN WG1 Meeting #104b-e R1-2103029 Apr. 20, 2021 (Apr. 20, 2021), the whole document.

Moderation (Erricsson) Summary #3-Enhancements for IIOT/URLLC on Unlicensed Band 3GPP TSG-RAN WG1 Meeting #104-bis-e Tdoc R1-2103851 Apr. 20, 2021(Apr. 20, 2021), the whole document.

Chinese Office Action issued in corresponding Chinese Patent Application No. 202180085948.X dated Mar. 13, 2026, pp. 1-5.

International Search Report and Written Opinion of the International Search Authority in International application No. PCTCN2022091283, mailed on Jul. 27, 2022.

NPL1: R1-2009259, Uplink enhancements for URLLC in unlicensed controlled environments, Nov. 2, 2020.

NPL2: ZTE, "Discussion on unlicensed band URLLC/IIoT", 3GPP TSG RAN WG1 Meeting #104-e R1-2100103,Feb. 5, 2021.

NPL3: vivo, "Discussion on the channel access procedures", 3GPP TSG RAN WG1#99 R1-1912012,Nov. 22, 2019.

NPL4: LG Electronics, "Discussion on unlicensed band URLLC/IIoT", 3GPP TSG RAN WG1 #103-e R1-2008059,Nov. 13, 2020.

Chinese Office Action issued in corresponding Chinese Patent Application No. 202180085626.5 dated May 22, 2026.

NPL5: R1-2006801"Uplink enhancements for URLLC in unlicensed controlled environments", Aug. 8, 2020.

* cited by examiner

USER EQUIPMENT, BASE STATION, AND CHANNEL ACCESS METHOD

CROSS REFERENCE TO RELATED APPLICATIONS

The disclosure is a US national phase application based upon an International Application No. PCT/CN2022/091284, filed on May 6, 2022, titled "USER EQUIPMENT, BASE STATION, AND CHANNEL ACCESS METHOD", which claims priority to International Application No. PCT/CN2021/140165, filed on Dec. 21, 2021, titled "CHANNEL ACCESS METHOD, USER EQUIPMENT, AND BASE STATION", and priority to U.S. provisional patent application No. 63/185,370 filed on May 7, 2021, which is incorporated by reference in the present application in its entirety.

BACKGROUND OF DISCLOSURE

1. Field of Disclosure

The present disclosure relates to the field of communication systems, and more particularly, to a user equipment, a base station, and channel access method in an unlicensed band.

2. Description of Related Art

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards being a broadband and mobile system. In cellular wireless communication systems, user equipment (UE) is connected by a wireless link to a radio access network (RAN). The RAN comprises a set of base stations (BSs) that provide wireless links to the UEs located in cells covered by the base station, and an interface to a core network (CN) which provides overall network control. As will be appreciated the RAN and CN each conduct respective functions in relation to the overall network. The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB.

Technical Problem

In NR-Unlicensed (NR-U), a channel occupancy time (COT) may be initiated by a base station or a UE in a fixed frame period (FFP). A device, such as a base station or a UE, initiates a COT is referred to as a COT initiator or an initiating device. COT has two COT types. A COT initiated by a gNB is referred to as a gNB-initiated COT. A COT initiated by a UE is referred to as a UE-initiated COT. Uplink (UL) transmission and downlink (DL) transmission between a UE and a base station in a COT are performed based on FFP parameters of a COT initiator of the COT.

Currently, determination of the COT initiator for scheduled UL transmissions or configured UL transmissions has following alternatives Alt-a or Alt-b. In a semi-static channel access mode when a UE can operate as initiating device, one of the following alternatives may be selected to determine whether a UL transmission is based on a UE-initiated COT or sharing a gNB-initiated COT:

Alt-a: Determination based on the content in the scheduling downlink control information (DCI); and Alt-b: Determination based on the rules applied for an UL transmission.

In a semi-static channel access mode, cross-FFP scheduling, for example, is a scheduling operation where a gNB can use a DCI to schedule UL transmission(s) in a later gNB's FFP period that is different from the gNB's FFP period that carries the scheduling DCI. In addition to intra-FFP scheduling, cross-FFP scheduling is under investigation. A gNB's FFP period is referred to as g-FFP. The cross-FFP scheduling has pending technical issues including whether and how to process a case where a gNB schedules an UL transmission in the the later g-FFP.

Hence, a method to support cross-FFP scheduling is desired.

SUMMARY

An object of the present disclosure is to propose a user equipment, a base station, and a channel access method in an unlicensed band.

In a first aspect, an embodiment of the invention provides a channel access method executable in a user equipment (UE), comprising:

receiving from a base station a downlink control information (DCI) within a region of a first fixed frame period (FFP), wherein the DCI is configured to schedule at least one portion of DL data within a region of a second FFP;

deriving a COT initiator associated with a channel occupancy time (COT) within the region of the second FFP; and receiving the at least one portion of the scheduled DL data in the channel occupancy time (COT) initialized by the derived initiator according to a reception condition.

In a second aspect, an embodiment of the invention provides a user equipment (UE) comprising a processor configured to call and run a computer program stored in a memory, to cause a device in which the processor is installed to execute the disclosed method.

In a third aspect, an embodiment of the invention provides a channel access method executable in a base station, comprising:

transmitting from the base station a downlink control information (DCI) within a region of a first fixed frame period (FFP), wherein the DCI is configured to schedule at least one portion of DL data within a region of a second FFP; and transmitting the at least one portion of the scheduled DL data in a channel occupancy time (COT) associated with a COT initiator within the region of the second FFP according to a transmission condition.

In a fourth aspect, an embodiment of the invention provides a base station comprising a processor configured to call and run a computer program stored in a memory, to cause a device in which the processor is installed to execute the disclosed method.

The disclosed method may be programmed as computer executable instructions stored in non-transitory computer-readable medium. The non-transitory computer-readable medium, when loaded to a computer, directs a processor of the computer to execute the disclosed method.

The non-transitory computer-readable medium may comprise at least one from a group consisting of: a hard disk, a CD-ROM, an optical storage device, a magnetic storage device, a Read-Only Memory, a Programmable Read-Only Memory, an Erasable Programmable Read-Only Memory, EPROM, an Electrically Erasable Programmable Read-Only Memory and a Flash memory.

The disclosed method may be programmed as a computer program product that causes a computer to execute the disclosed method.

The disclosed method may be programmed as a computer program, that causes a computer to execute the disclosed method.

Advantageous Effects

At least one embodiment of the disclosed method provides procedures and schemes to support cross-FFP DL scheduling, wherein a COT for DCI that schedules physical downlink shared channel (PDSCH) or a COT for PDSCH transmission can be gNB-initiated or UE-initiated.

At least one embodiment of the disclosed method provides procedures and schemes to support cross-FFP UL scheduling, wherein a COT for DCI that schedules PUSCH or a COT for PUSCH transmission can be gNB-initiated or UE-initiated.

Embodiments of the disclosure provide useful technical effects of improving scheduling flexibility for semi-static channel access.

A base station scheduling physical downlink shared channel (PDSCH) and/or physical uplink shared channel (PUSCH) in a current FFP carrying a scheduling DCI and/or a later FFP can enhance the efficiency of radio resource utilization.

When the location of the scheduling DCI is at the end of a current FFP, a UE-initiated COT in the next FFP can reduce transmission latency.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure. A person having ordinary skills in this field may obtain other figures according to these figures without paying the premise.

DETAILED DESCRIPTION OF EMBODIMENTS

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Embodiments of the invention address the issues of cross-FFP scheduling for both DL and UL cases, such as cross-FFP scheduling indication, determination of UL and DL scheduling based on gNB-initiated or UE-initiated COT, DL/UL cancellation scheme, etc.

Figure 1:
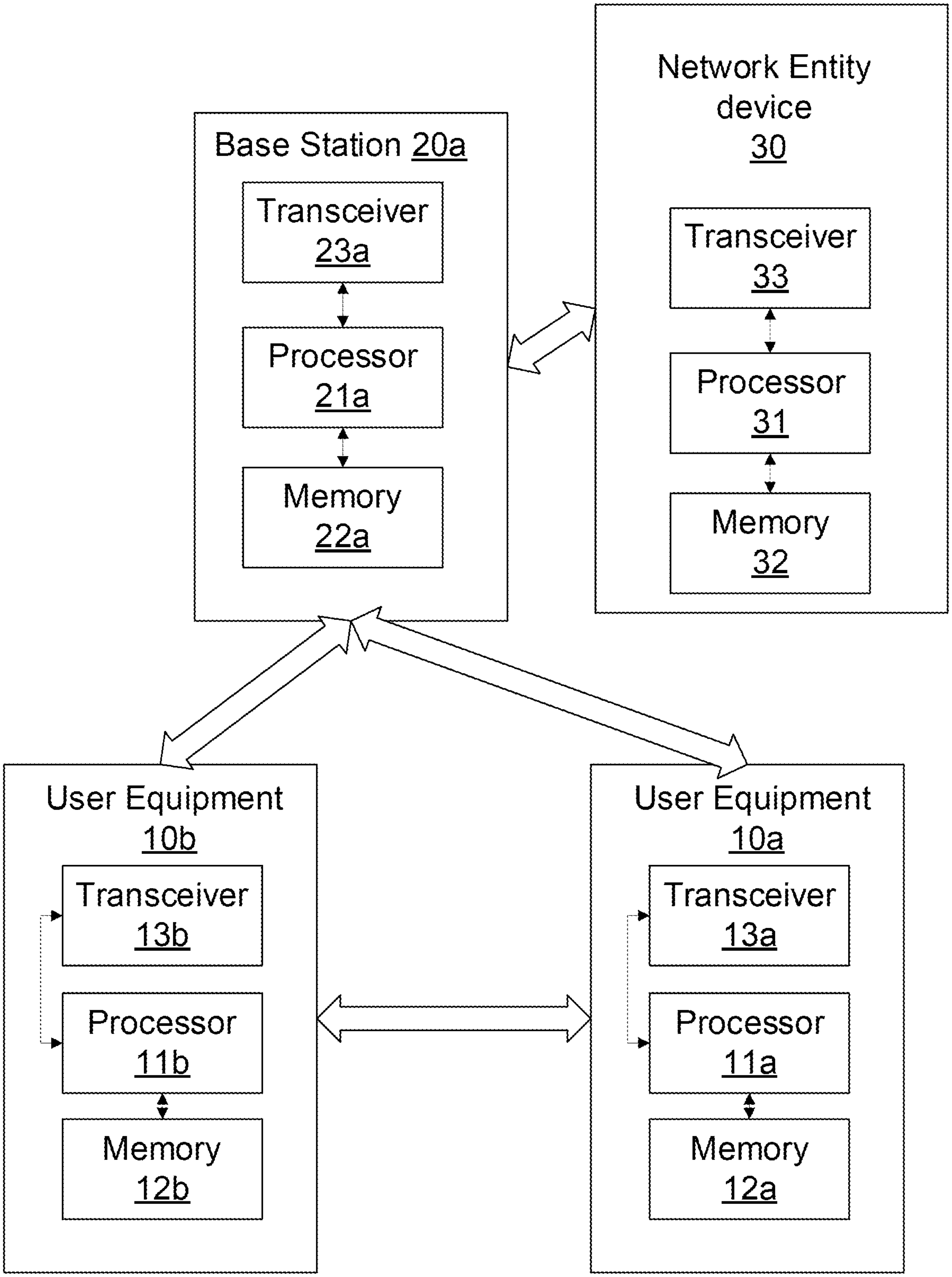
FIG. 1 illustrates a schematic view of a telecommunication system.

With reference to FIG. 1, a telecommunication system including a UE 10*a*, a UE 10*b*, a base station (BS) 20*a*, and a network entity device 30 executes the disclosed method according to an embodiment of the present disclosure. FIG. 1 is shown for illustrative, not limiting, and the system may comprise more UEs, BSs, and CN entities. Connections between devices and device components are shown as lines and arrows in the FIGS. The UE 10*a* may include a processor 11*a*, a memory 12*a*, and a transceiver 13*a*. The UE 10*b* may include a processor 11*b*, a memory 12*b*, and a transceiver 13*b*. The base station 20*a* may include a processor 21*a*, a memory 22*a*, and a transceiver 23*a*. The network entity device 30 may include a processor 31, a memory 32, and a transceiver 33. Each of the processors 11*a*, 11*b*, 21*a*, and 31 may be configured to implement proposed functions, procedures and/or methods described in the description. Layers of radio interface protocol may be implemented in the processors 11*a*, 11*b*, 21*a*, and 31. Each of the memory 12*a*, 12*b*, 22*a*, and 32 operatively stores a variety of programs and information to operate a connected processor. Each of the transceivers 13*a*, 13*b*, 23*a*, and 33 is operatively coupled with a connected processor, transmits and/or receives radio signals or wireline signals. The UE 10*a* may be in communication with the UE 10*b* through a sidelink. The base station 20*a* may be an eNB, a gNB, or one of other types of radio nodes, and may configure radio resources for the UE 10*a* and UE 10*b*.

Each of the processors 11*a*, 11*b*, 21*a*, and 31 may include an application-specific integrated circuit (ASICs), other chipsets, logic circuits and/or data processing devices. Each of the memory 12*a*, 12*b*, 22*a*, and 32 may include read-only memory (ROM), a random access memory (RAM), a flash memory, a memory card, a storage medium and/or other storage devices. Each of the transceivers 13*a*, 13*b*, 23*a*, and 33 may include baseband circuitry and radio frequency (RF) circuitry to process radio frequency signals. When the embodiments are implemented in software, the techniques described herein may be implemented with modules, procedures, functions, entities, and so on, that perform the functions described herein. The modules may be stored in a memory and executed by the processors. The memory may be implemented within a processor or external to the processor, in which those may be communicatively coupled to the processor via various means are known in the art.

The network entity device 30 may be a node in a CN. CN may include LTE CN or 5G core (5GC) which includes user plane function (UPF), session management function (SMF), mobility management function (AMF), unified data management (UDM), policy control function (PCF), control plane (CP)/user plane (UP) separation (CUPS), authentication server (AUSF), network slice selection function (NSSF), and the network exposure function (NEF).

An example of the UE in the description may include one of the UE 10*a* or UE 10*b*. An example of the base station in the description may include the base station 20*a*. Uplink (UL) transmission of a control signal or data may be a transmission operation from a UE to a base station. Downlink (DL) transmission of a control signal or data may be a transmission operation from a base station to a UE. In the following description, unless elsewhere specified, a UE can be interpreted as an embodiment of the UE 10, and a gNB or a base station can be interpreted as an embodiment of the gNB 20.

In the description, for simplicity, a COT initiated by a base station is referred to as a gNB-initiated COT, a BS-initiated COT, or a gNB's COT. A COT initiated by a UE is referred to as a UE-initiated COT or a UE's COT. In the description, unless being specifically pointed out, a gNB-initiated COT may be a COT initiated by a base station, such as gNB 20, according to an embodiment of the disclosure; a UE-initiated COT may be a COT initiated by a UE, such as the UE 10, according to an embodiment of the disclosure; a gNB's FFP referred to as g-FFP is an FFP according to a set of FFP parameters associated with a base station, such as the gNB 220, according to an embodiment of the disclosure; and a UE's FFP referred to as u-FFP is an FFP according to a set of FFP parameters associated with a UE, such as the UE 10, according to an embodiment of the disclosure.

A scheme of initiating a COT by a base station is referred to as a gNB-initiated COT scheme or gNB-initiated COT function, and a scheme of initiating a COT by a UE is referred to as a UE-initiated COT scheme or UE-initiated COT function. For simplicity, the scheme of gNB-initiated COT may be referred to as gNB-initiated COT, and the scheme of UE-initiated COT may be referred to as UE-initiated COT.

In the description, PUSCH transmission means transmission performed by a UE, such as the UE 10, for PUSCH(s) scheduled by DCI. DCI that schedules PUSCH(s) is referred to as scheduling DCI. In the description, PUSCH scheduled for PUSCH transmission may comprise one or more PUSCHs. In the description, PDSCH transmission means transmission performed by a UE, such as the UE 10, for PDSCH(s) scheduled by DCI. DCI that schedules PDSCH (s) is referred to as scheduling DCI. PDSCH scheduled for PDSCH transmission may comprise one or more PDSCHs.

In the description, the term of "UL channel" means a UL channel in the unlicensed band, and the term of "DL channel" means a DL channel in the unlicensed band. To access a channel means to access a channel in the unlicensed band. The terms "channel access method", "channel access mode", and "channel access scheme" means a channel access method, channel access mode, and channel access scheme for a channel in the unlicensed band.

Figure 2:
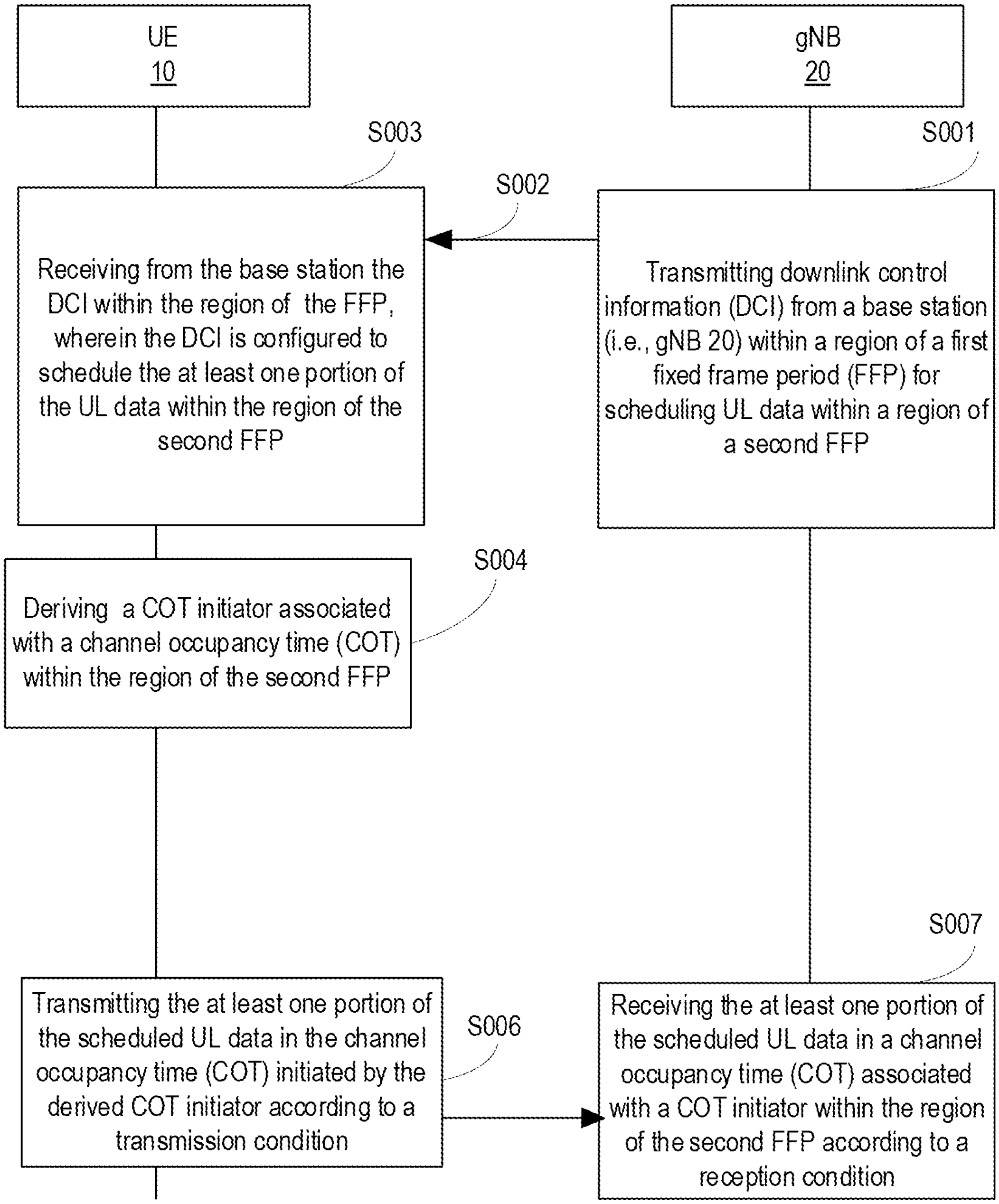
FIG. 2 illustrates a schematic view showing a channel access method according to an embodiment of the invention.

With reference to FIG. 2, a base station, such as the gNB 20, transmits downlink control information (DCI) S002 within a region of a first fixed frame period (FFP). The DCI S002 is configured to schedule at least one portion of UL data within a second FFP (S001). A user equipment (UE), such as the UE 10, receives from the base station the DCI S002 within the region the first FFP for scheduling the at least one portion of the UL data within the region of the second FFP (S003).

The UE derives a channel occupancy time (COT) initiator associated with a COT within the region of the second FFP (S004). The UE transmits the at least one portion of the scheduled UL data in the COT initiated by the derived COT initiator according to a transmission condition for the UE (S006). The base station receives the at least one portion of the scheduled UL data in the COT associated with a COT initiator within the region of the second FFP according to a reception condition for the base station (S007).

Figure 3:
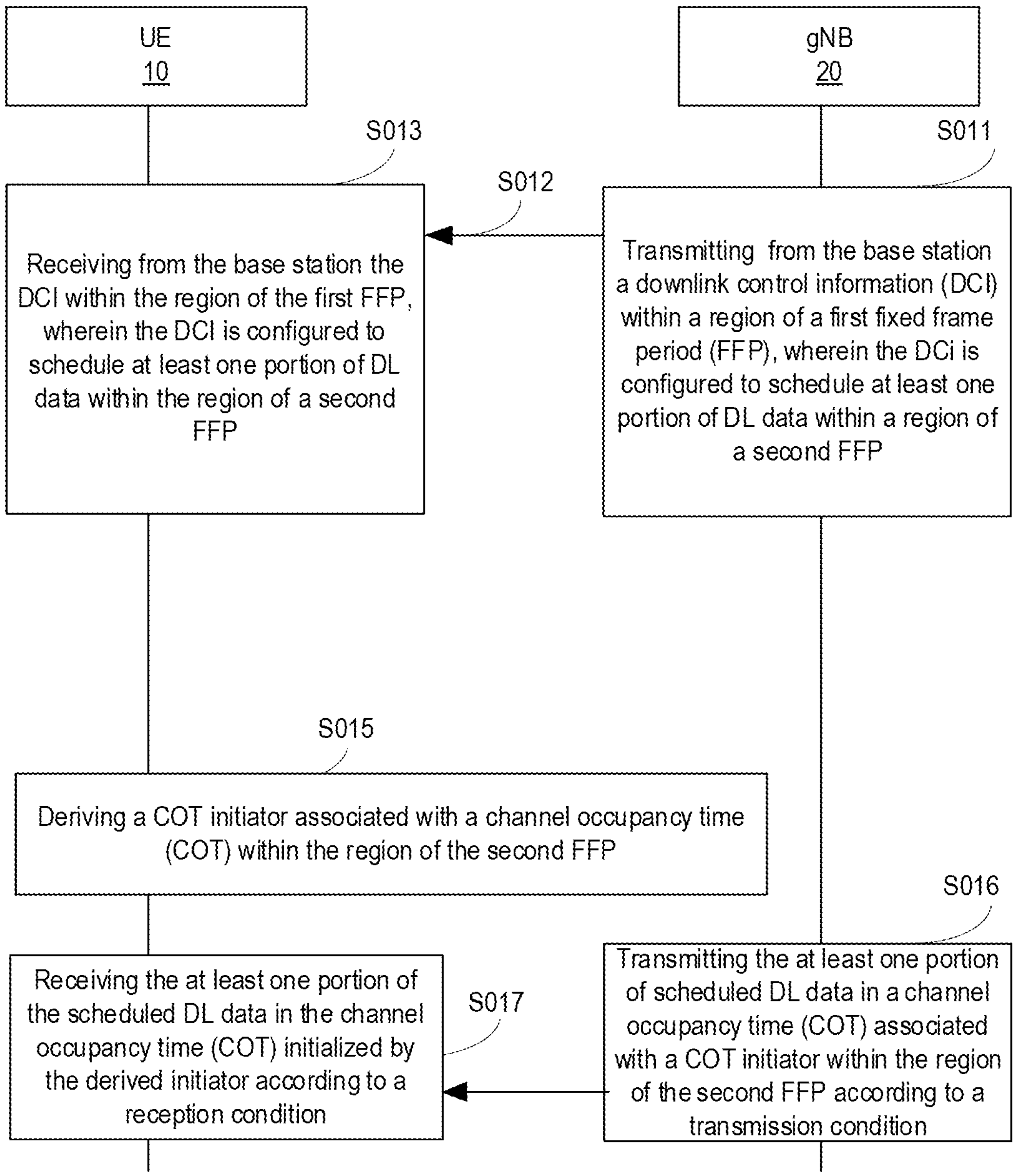
FIG. 3 illustrates a schematic view showing a channel access method according to another embodiment of the invention.

With reference to FIG. 3, a base station, such as gNB 20, transmits DCI S012 within a region of a first FFP, wherein the DCI S012 is configured to schedule at least one portion of DL data within a region of a second FFP (S011). A user equipment (UE), such as the UE 10, receives the DCI from the base station the DCI within the region of the first FFP for scheduling the at least one portion of the DL data within the region of the second FFP (S013).

The UE derives a COT initiator associated with a COT within the region of the second FFP (S015). The base station transmits at least one portion of the scheduled DL data in the COT associated with a COT initiator within the region of the second FFP according to a transmission condition for the base station (S016).

The UE receives the at least one portion of the scheduled DL data in the COT initialized by the derived initiator according to a reception condition for the UE (S017).

Embodiment 1: (Cross-FFP UL Scheduling Indication)

Figure 4:
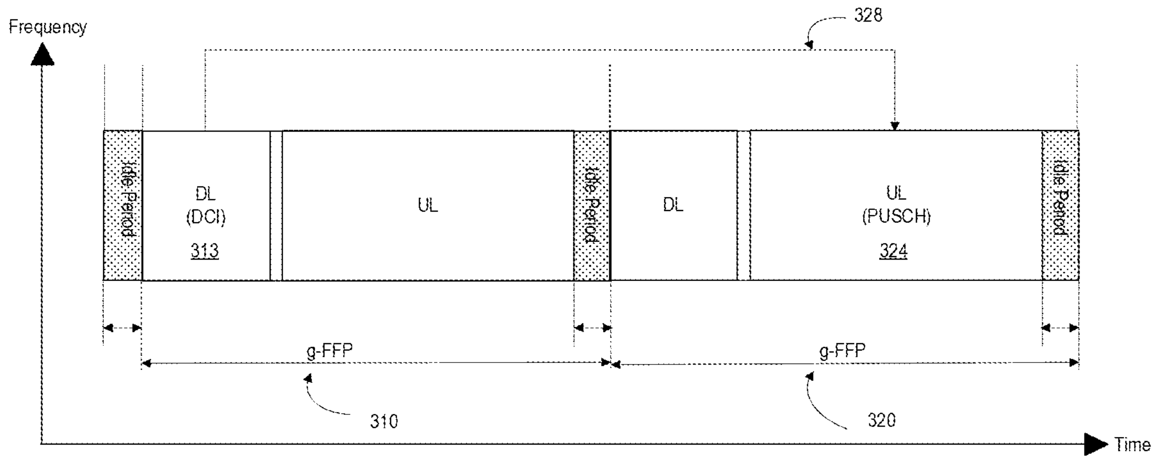
FIG. 4 illustrates a schematic view showing an example of cross-FFP UL scheduling.

For cross-FFP UL scheduling in the semi-static channel access mode, i.e., the gNB 20 can use DCI (referred to as scheduling DCI) in a g-FFP to schedule physical uplink shared channel (PUSCH) transmission(s) in later g-FFP(s) that is different from the g-FFP that carries the scheduling DCI, the location of g-FFP(s) used for scheduled PUSCH transmission can be indicated by the gNB 20 using an indication, such as bit field, in the DCI. With reference to FIG. 4, for example, the gNB 20 can use DCI (referred to as scheduling DCI) 313 in a DL transmission in a g-FFP 310 to schedule (denoted as cross-FFP UL scheduling 328) transmission of PUSCH 324 in a later g-FFP 320 that is different from the g-FFP 310 that carries the scheduling DCI 313. The location of g-FFP 320 used for scheduled transmission of PUSCH 324 can be indicated by the gNB 20 using an indication, such as a bit field, in the DCI 313.

In an embodiment, the gNB 20 may use a g-FFP configuration to indicate a g-FFP length of an FFP (e.g., FFP 320) at a granularity.

In an embodiment, the gNB 20 may use an indication to indicate a location of a g-FFP (e.g., FFP 320) for scheduled PUSCH transmission. The indicated location of a g-FFP (e.g., FFP 320) for scheduled PUSCH transmission (e.g., PUSCH 324) is an offset value relative to the g-FFP (e.g., FFP 310) that carries the scheduling DCI that schedules the PUSCH transmission.

Embodiment 2: (Cross-FFP DL Scheduling Indication)

Figure 5:
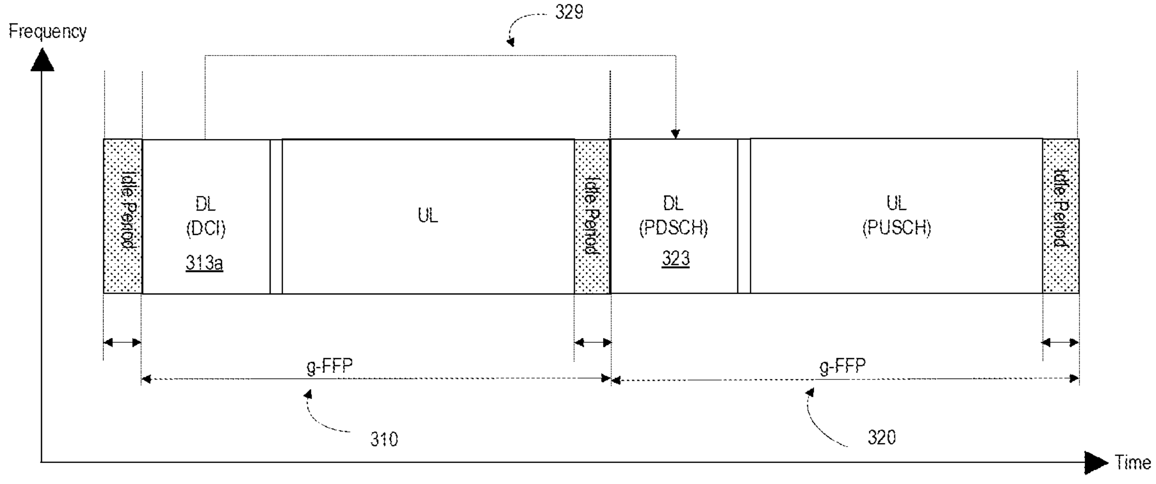
FIG. 5 illustrates a schematic view showing an example of cross-FFP DL scheduling.

For cross-FFP DL scheduling in the semi-static channel access mode, i.e., the gNB 20 can use DCI (referred to as scheduling DCI) in a g-FFP to schedule physical downlink shared channel (PDSCH) transmission(s) in a later g-FFP that is different from the g-FFP that carries the scheduling DCI, the location of g-FFP(s) used for scheduled PDSCH transmission can be indicated by the gNB 20 using an indication, such as a bitfield, in the DCI. With reference to FIG. 5, for example, the gNB 20 can use DCI (referred to as scheduling DCI) 313*a* in a DL transmission in a g-FFP 310 to schedule (denoted as cross-FFP DL scheduling 329) transmission of PDSCH 323 in a later g-FFP 320 that is different from the g-FFP 310 that carries the scheduling DCI 313*a*. The location of g-FFP 320 used for scheduled transmission of PDSCH 323 can be indicated by the gNB 20 using an indication, such as a bit field, in the DCI 313*a*.

In an embodiment, the gNB 20 may use a g-FFP configuration to indicate a g-FFP length of an FFP (e.g., FFP 320) at a granularity.

In an embodiment, the gNB 20 may use an indication to indicate a location of a g-FFP (e.g., FFP 320) for scheduled PDSCH transmission. The indicated location of a g-FFP (e.g., FFP 320) for scheduled PDSCH transmission (e.g., PDSCH 323) is an offset value relative to the g-FFP (e.g., FFP 310) that carries the scheduling DCI that schedules the PUSCH transmission.

Embodiment 3: (Multiple Cross-FFP UL Scheduling Indication)

For cross-FFP UL scheduling in the semi-static channel access mode, the gNB 20 may use DCI to schedule one or more PUSCHs in one or more g-FFPs. The one or more g-FFPs may comprise one current g-FFP carrying scheduling DCI and/or one or more later g-FFPs carrying one or more PUSCHs scheduled by the DCI. The one or more PUSCHs may comprise PUSCH repetitions of the same transport block (TB) or comprise different TBs. Embodiments of scheduling and transmission schemes are illustrated in the following.

In an embodiment, the one or more g-FFPs comprise consecutive g-FFPs. The gNB 20 may use DCI to indicate the consecutive g-FFPs by indicating a starting g-FFP and an ending g-FFP of the consecutive g-FFPs. Alternatively, the gNB 20 may use DCI to indicate the consecutive g-FFPs by indicating a starting g-FFP and a length of the consecutive g-FFPs.

In an embodiment, at least one of uplink control information similar to uplink control information used for a configured grant scheduling (CG-UCI), such as COT sharing indication, hybrid automatic repeat request (HARQ) process identifier (ID), new data indicator (NDI), or redundancy version (RV) can be carried in one or more scheduled PUSCHs in the region of one or more g-FFPs.

Thus, in an embodiment, the UL data comprises one or more physical uplink shared channels (PUSCHs), transmissions of the one or more PUSCHs are transmitted in one or more FFPs starting from the second FFP, and the one or more PUSCHs carry PUSCH repetitions of the same transport block (TB) or carry different TBs. In an embodiment, the indicated COT initiator is applied to the one or more PUSCHs.

In an embodiment, COT sharing information is carried in at least one of the one or more PUSCHs. The UE provides sharing information of the COT initiated by the UE to the base station.

Embodiment 4: (Multiple Cross-FFP DL Scheduling Indication)

For cross-FFP DL scheduling in the semi-static channel access mode, the gNB 20 may use DCI to schedule one or more PDSCHs in one or more g-FFPs. The one or more g-FFPs may comprise one current g-FFP carrying scheduling DCI and/or one or more later g-FFPs carrying one or more PDSCHs scheduled by the DCI. The one or more PDSCHs may comprise PDSCH repetitions of the same transport block (TB) or comprise different TBs. Embodiments of scheduling and transmission schemes are illustrated in the following.

In an embodiment, the one or more g-FFPs comprise consecutive g-FFPs. The gNB 20 may use DCI to indicate the consecutive g-FFPs by indicating a starting g-FFP and an ending g-FFP of the consecutive g-FFPs. Alternatively, the gNB 20 may use DCI to indicate the consecutive g-FFPs by indicating a starting g-FFP and a length of the consecutive g-FFPs.

Thus, in an embodiment, the DL data comprises one or more physical downlink shared channels (PDSCHs), transmissions of the one or more PDSCHs are transmitted in one or more FFPs starting from the second FFP, and the one or more PDSCHs carry PDSCH repetitions of the same transport block (TB) or carry different TBs. In an embodiment, the indicated COT initiator is applied to the one or more PDSCHs.

Embodiment 5: (Dynamic Indication of a COT Initiator for Cross-FFP UL Scheduling)

The embodiment 5 provides examples of the transmission condition and the reception condition in FIG. 2. Both the first FFP and the second FFP may be determined based on FFP parameters associated with the base station that provides the DCI. The UE may derive the COT initiator based on an indication in the DCI. Alternatively, the second FFP may be determined based on FFP parameters associated with the UE.

In the description, PUSCH scheduled for PUSCH transmission by a UE may comprise one or more PUSCHs. If PUSCH is cross-FFP scheduled by DCI or the location of PUSCH is not confined before an idle period of a g-FFP that carries the scheduling DCI or is ended at a later g-FFP, the following applies.

Transmission of the scheduled PUSCH can be based on sharing a gNB-initiated COT initiated by a gNB or a UE-initiated COT initiated by an initiative UE. Whether a scheduled PUSCH transmission is based on sharing a gNB-initiated COT or a UE-initiated COT can be determined by the UE according to an indication, such as a bitfield, in the scheduling DCI.

If sharing gNB-initiated COT is indicated in the scheduling DCI, whether the scheduled PUSCH transmission is performed or not depends on whether a gNB (e.g., the gNB 20) can successfully initiate a COT during the later g-FFP in which the PUSCH is scheduled.

A UE (e.g., the UE 10) can perform PUSCH transmission only if the UE detects a DL signal or a DL channel transmitted from the gNB and determines the gNB has initiated the COT based on the detecting as well as the UE can successfully access the channel for UL transmission according to an LBT scheme indicated by the gNB. Detecting of a DL signal or a DL channel transmitted from the gNB may be referred to as DL detection, DL channel/signal detection, or DL signal/channel detection. Thus, in an embodiment, the derived COT initiator is the base station. The transmission condition for the UE comprises that the UE determines the base station has initiated the COT in the second FFP and the UE successfully shares the COT initiated by the base station based on a channel access scheme. The reception condition for the base station comprises that the base station successfully initiates the COT in the second FFP based on a channel access scheme, and the UE successfully shares the COT initiated by the base station based on a channel access scheme.

If the gNB cannot initiate the COT due to LBT failure during the later g-FFP in which the PUSCH is scheduled and hence no DL signal or DL channel can be detected by the UE, the UE cancels PUSCH transmission of the scheduled PUSCH automatically.

If UE-initiated COT is indicated in the scheduling DCI, and if the scheduled PUSCH is also aligned with a boundary of a UE's FFP (u-FFP), the UE can perform PUSCH transmission for the scheduled PUSCH based on a UE-initiated COT. Otherwise, the UE cancels the PUSCH transmission automatically. A boundary of a UE's FFP (u-FFP) may be referred to as a u-FFP boundary. Thus, in an embodiment, the derived COT initiator is the UE. The transmission condition for the UE comprises that the initial point of the scheduled UL data is aligned with a boundary of an FFP associated with the UE and the UE successfully initiates the COT based on a channel access scheme. The reception condition for the base station comprises that the initial point of the scheduled UL data is aligned with a boundary of an FFP associated with the UE and the UE successfully initiates the COT based on a channel access scheme.

If gNB-initiated COT is indicated in the scheduling DCI, and the gNB cannot initiate the COT due to LBT failure during the later g-FFP in which the PUSCH is scheduled, and hence no DL signal/channel can be detected by UE:

If the scheduled PUSCH is also aligned with a u-FFP boundary and the UE is configured as being allowed to initiate UE's COT upon failed DL signal/channel detection, the UE can perform PUSCH transmission for the scheduled PUSCH based on a UE-initiated COT. Otherwise, the UE cancels the PUSCH transmission automatically.

If UE-initiated COT is indicated in the scheduling DCI, and the scheduled PUSCH is not aligned with a u-FFP boundary, the following applies:

If being specified in the specification or being configured in gNB configuration or being indicate by a dynamic indication, the UE can initiate a COT at the beginning of a u-FFP to perform subsequent scheduled PUSCH transmission based on the UE-initiated COT.

Note that cyclic prefix (CP) extension can be adopted to extend starting point of the PUSCH transmission of the scheduled PUSCH to the u-FFP boundary.

Thus, in an embodiment, the derived COT initiator is the UE. When the initial point of the scheduled UL data is not aligned with a boundary of an FFP associated with the UE, the transmission condition for the UE comprises that the UE has initiated the COT in the FFP associated with the UE covering the scheduled UL data and the UE successfully accessing the COT based on a channel access scheme, and the reception condition for the base station comprises that the UE has initiated the COT in the FFP associated with the UE covering the scheduled UL data and the UE successfully accesses the COT initiated by the UE based on a channel access scheme.

Embodiment 5-1: (an Example of a Dynamic Indication Procedure that Indicates a COT Initiator for Cross-FFP UL Scheduling)

Figure 6:
FIG. 6 illustrates a schematic view showing an example of a dynamic indication procedure that indicates a COT initiator for cross-FFP UL scheduling.

With reference to FIG. 6, a UE (e.g., the UE 10) determines PUSCH is cross-FFP scheduled based on received indication in DCI (S101). That is, a gNB (e.g., the gNB 20) uses a DCI in an FFP to schedule PUSCH in a later FFP that is different from the FFP that carries the scheduling DCI. In the description, PUSCH scheduled for PUSCH transmission may comprise one or more PUSCHs.

If UE-initiated COT is indicated in the DCI for PUSCH transmission (S102), then:

If the scheduled PUSCH is aligned with a u-FFP (S107) and the UE successfully initiates a COT in the u-FFP of the scheduled PUSCH (S108), the UE transmits the scheduled PUSCH based on the UE-initiated COT (S109). Otherwise, the UE cancels the scheduled PUSCH transmission (S106). The u-FFP of the scheduled PUSCH is a u-FFP in which the scheduled PUSCH is scheduled by the DCI.

If gNB-initiated COT is indicated in the DCI for PUSCH transmission (S102), then:

If the gNB can initiate a COT in a g-FFP of scheduled PUSCH (S103) and the UE can detect a DL signal/channel from the gNB and the UE can successfully acquire a UL channel after LBT (S104), the UE transmits scheduled PUSCH based on sharing gNB initiated COT (S105). Otherwise, UE cancels the scheduled PUSCH transmission (S106). The g-FFP of the scheduled PUSCH is a g-FFP in which the scheduled PUSCH is scheduled by the DCI.

Embodiment 6: (Dynamic Indication of a COT Initiator for Cross-FFP DL Scheduling)

The embodiment 6 provides examples of the transmission condition and the reception condition in FIG. 3. Both the first FFP and the second FFP may be determined based on FFP parameters associated with the base station that provides the DCI. The UE may derive the COT initiator based on an indication in the DCI. Alternatively, the second FFP may be determined based on FFP parameters associated with the UE.

In the description, PDSCH scheduled for PDSCH reception by a UE may comprise one or more PDSCH s. If PDSCH is cross-FFP scheduled by DCI or the location of PDSCH is not confined before an idle period of a g-FFP that carries the scheduling DCI or is ended at the later g-FFP, the following applies. Transmission of the scheduled PDSCH can be based on sharing a UE-initiated COT initiated by an initiative UE or a gNB-initiated COT initiated by gNB. Whether a scheduled PDSCH transmission is based on sharing a UE-initiated COT or a gNB-initiated COT can be determined by the UE according to an indication, such as a bitfield, in the scheduling DCI.

If gNB-initiated COT is indicated in the scheduling DCI, whether the scheduled PDSCH transmission is performed or not depends on whether a gNB (e.g., the gNB 20) can successfully initiate a COT during the later g-FFP in which the PDSCH is scheduled.

- A UE (e.g., the UE 10) can receive PDSCH transmission only if the gNB has initiated a COT according to a semi-static channel access scheme during the later g-FFP in which the PDSCH is scheduled. Thus, in an embodiment, the derived COT initiator is the base station. The transmission condition for the base station comprises that the initial point of the scheduled DL data is aligned with a boundary of the second FFP and the base station successfully initiates the COT in the second FFP based on a channel access scheme. The reception condition for the UE comprises that the initial point of the scheduled DL data is aligned with a boundary of the second FFP and the base station successfully initiates the COT in the second FFP based on a channel access scheme. Alternatively, when the COT initiator is the base station and when the initial point of the scheduled DL data is not aligned with a boundary of the second FFP, the transmission condition for the base station comprises that the base station initiates the COT in the second FFP and the base station successfully accesses the COT based on a channel access scheme. The reception condition for the UE comprises that the base station initiates the COT in the second FFP and the base station successfully accesses the COT based on a channel access scheme.
- If the gNB cannot initiate the COT due to LBT failure during the later g-FFP in which the PDSCH is scheduled, the gNB cancels the PDSCH transmission of the scheduled PDSCH.

If sharing UE-initiated COT for PDSCH transmission is indicated in the scheduling DCI, whether the scheduled PDSCH is to be transmitted or not depends on if the UE can successfully initiate a COT during the later g-FFP in which the PDSCH is scheduled.

- The gNB can perform PDSCH transmission for the scheduled PDSCH only if the gNB determines the UE has initiated the COT by detecting the UL signal/channel transmitted from UE as well as gNB can successfully access the channel for DL transmission according to an LBT scheme for semi-static channel access. Thus, in an embodiment, the derived COT initiator is the UE. The transmission condition for the base station comprises that the base station determines the UE has initiated the COT in an FFP associated with the UE and the base station successfully shares the COT initiated by the UE based on a channel access scheme. The reception condition for the UE comprises that the UE has initiated the COT in an FFP associated with the UE, and the base station successfully shares the COT initiated by the UE based on a channel access scheme.
- If the UE cannot initiate a COT due to LBT failure during the later g-FFP in which the PDSCH is scheduled and hence no UL signal/channel can be detected by gNB, the gNB cancels the PDSCH transmission.

Embodiment 6-1: (an Example of a Dynamic Indication Procedure that Indicates a COT Initiator for Cross-FFP DL Scheduling)

Figure 7:
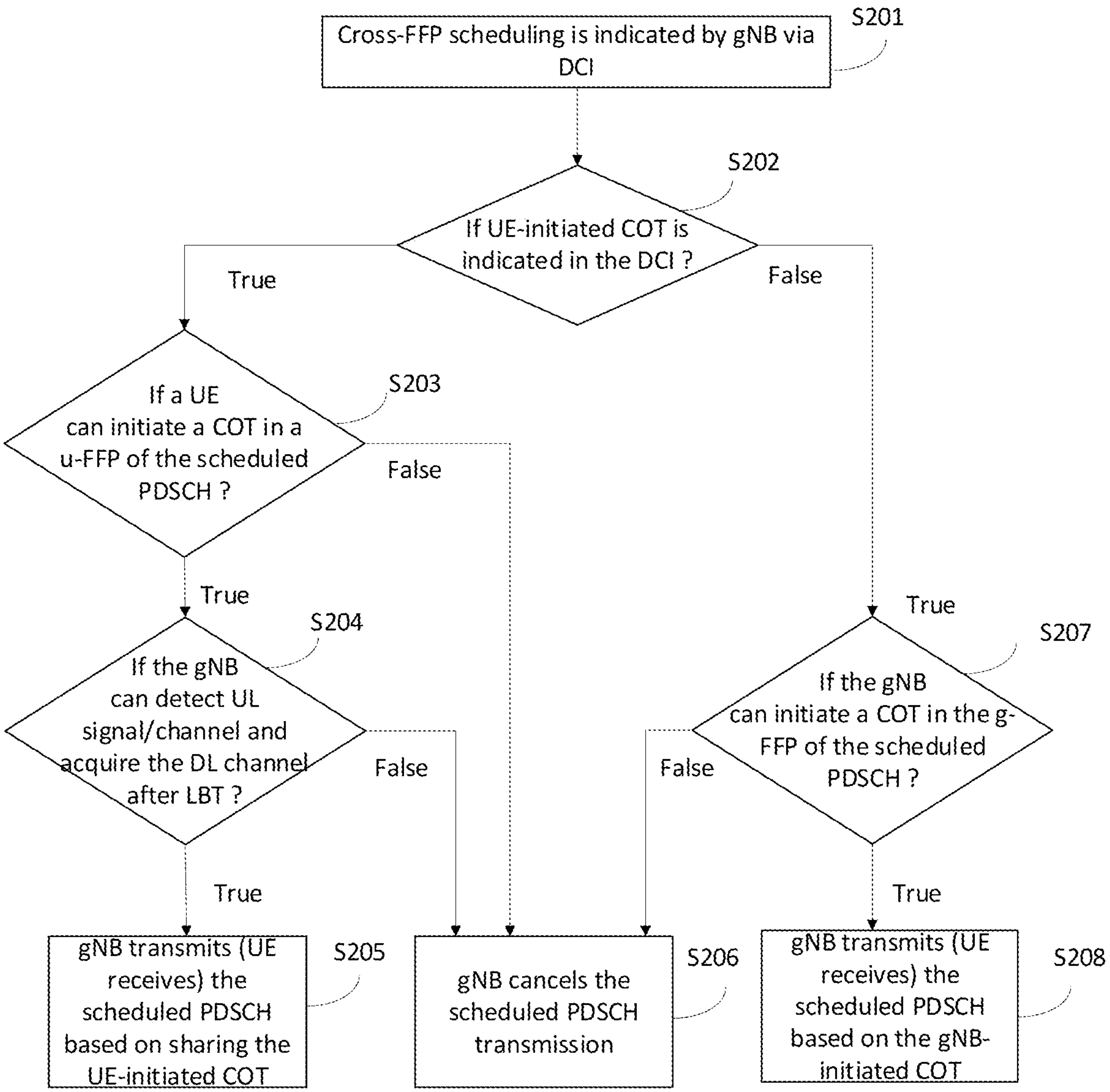
FIG. 7 illustrates a schematic view showing an example of a dynamic indication procedure that indicates a COT initiator for cross-FFP DL scheduling.

With reference to FIG. 7, the PDSCH is cross-FFP scheduled based on an indication in DCI received by a UE (e.g., the UE 10) (S201). That is, a gNB (e.g., the gNB 20) uses a DCI in an FFP to schedule PDSCH in a later FFP that is different from the FFP that carries the scheduling DCI. In the description, PDSCH scheduled for PDSCH transmission may comprise one or more PDSCHs.

If UE-initiated COT is indicated in the DCI for PDSCH transmission (S202), then:

- If the UE can initiate a COT in a u-FFP of scheduled PDSCH (S203) and the gNB can detect a UL signal/channel from the UE and the gNB can successfully acquire a DL channel after LBT (S204), the gNB transmits the scheduled PDSCH and the UE receives the scheduled PDSCH through sharing the UE-initiated COT (S205). Otherwise, the gNB cancels the scheduled PDSCH transmission (S206). The u-FFP of the scheduled PDSCH is a u-FFP in which the scheduled PDSCH is scheduled by the DCI.

If gNB-initiated COT is indicated in the DCI for PDSCH transmission (S202), then:

- If the gNB can successfully initiate a COT in a g-FFP of the scheduled PDSCH (S207), the gNB transmits the scheduled PDSCH and the UE receives the scheduled PDSCH based on the gNB-initiated COT (S208). Otherwise, the gNB cancels the scheduled PDSCH transmission (S206). The g-FFP of the scheduled PDSCH is a g-FFP in which the scheduled PDSCH is scheduled by the DCI.

Embodiment 7: (Preconfigured Rules for Determination of a COT Initiator for Cross-FFP UL Scheduling)

In the description, PUSCH scheduled for PUSCH transmission may comprise one or more PUSCHs. If PUSCH is cross-FFP scheduled by DCI or the location of the PUSCH is not confined before a idle period of a g-FFP that carries the scheduling DCI or is ended at the later g-FFP, the following applies.

Whether transmission of the scheduled PUSCH is based on sharing a gNB-initiated COT or a UE-initiated COT can be implicitly determined according to at least one of the following channel access rules:

- Rule 1: A UE (e.g., the UE 10) assumes PUSCH transmission of the scheduled PUSCH is based on a UE-initiated COT.
- Rule 2: If a starting point of the scheduled PUSCH is aligned with a u-FFP boundary, the COT type can be determined based on following schemes:
  - Scheme 1: The UE assumes the PUSCH transmission of the scheduled PUSCH is based on a UE-initiated COT.
  - Scheme 2: If the scheduled PUSCH is also overlapped with a g-FFP and is ended before a idle period of the g-FFP, and the UE has determined that the gNB (e.g., the gNB 20) has initiated the g-FFP based on detection of a DL signal or a DL channel, the UE assumes that the PUSCH transmission is based on sharing a gNB-initiated COT. Otherwise, the UE assumes the PUSCH transmission is based on a UE-initiated COT.

Rule 3: If the starting point of the scheduled PUSCH is not aligned with a u-FFP boundary, the COT type can be determined based on the following schemes:

Scheme 1: Two conditions are used. If the scheduled PUSCH is also overlapped with a later g-FFP and is ended before an idle period of the later g-FFP, and the UE determines that the gNB has initiated the g-FFP based on detection of a DL signal or a DL channel (i.e., the first condition), the UE assumes the PUSCH transmission is based on sharing a gNB-initiated COT. Otherwise, if the UE has initiated a u-FFP (i.e., the second condition), the UE assumes that the PUSCH transmission is based on the UE-initiated COT. If both of above conditions are not met, the UE cancels the PUSCH transmission for the scheduled PUSCH.

Scheme 2: Two conditions are used. If the UE has initiated the u-FFP (i.e., the first condition), the UE assumes that the PUSCH transmission is based on the UE-initiated COT. Otherwise, if the scheduled PUSCH is also overlapped with a g-FFP and is ended before the idle period of the g-FFP, and the UE determines that the gNB has initiated the g-FFP based on detection of a DL signal or a DL channel (i.e., the second condition), the UE assumes the PUSCH transmission is based on sharing the gNB-initiated COT. If both of above conditions are not met, the UE cancels the PUSCH transmission for the scheduled PUSCH.

Thus, in an embodiment, the UE may derive the COT initiator based on whether an initial point of the scheduled UL data is aligned with a boundary of the second FFP.

When the initial point of the scheduled UL data is aligned with the boundary of the FFP associated with the UE, the derived COT initiator is the UE. The transmission condition for the UE comprises that the UE successfully initiates the COT in the FFP associated with the UE based on a channel access scheme. The reception condition for the base station comprises that the UE successfully initiates the COT in the FFP associated with the UE based on a channel access scheme.

When the initial point of the scheduled UL data is aligned with the boundary of the FFP associated with the UE, the derived COT initiator is the base station if the UE determines that the base station has initiated the COT in the second FFP. The transmission condition for the UE comprises that the UE successfully shares the COT in the second FFP based on a channel access scheme. The reception condition for the base station comprises that the UE successfully shares the COT in the second FFP based on a channel access scheme.

When the initial point of the scheduled UL data is not aligned with the boundary of the FFP associated with the UE, the derived COT initiator is the UE if the UE has initiated the COT in the FFP associated with the UE covering the scheduled UL data. That is the COT initiated by the UE covers the scheduled UL data. The transmission condition for the UE comprises that UE successfully accesses the COT based on a channel access scheme. The reception condition for the base station comprises that UE successfully accesses the UE-initiated COT based on a channel access scheme.

Embodiment 7-1: (an Example Procedure Using Preconfigured Rules to Determine a COT Initiator for Cross-FFP UL Scheduling)

Figure 8:
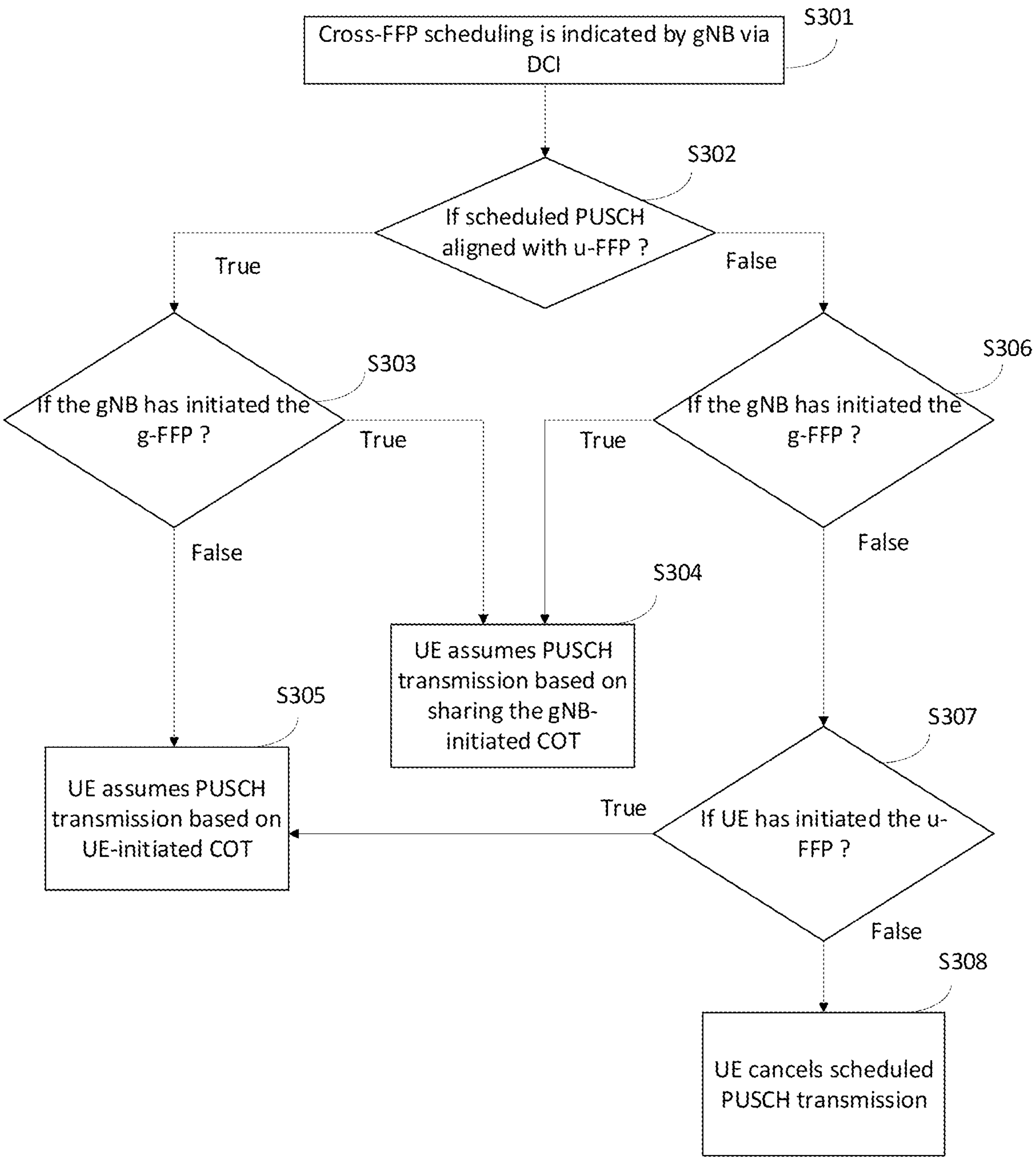
FIG. 8 illustrates a schematic view showing an example of using preconfigured rules to determine a COT initiator for cross-FFP UL scheduling.

With reference to FIG. 8, PUSCH is cross-FFP scheduled based on an indication in DCI received by a UE (e.g., the UE 10) (S301). In the description, PUSCH scheduled for PUSCH transmission may comprise one or more PUSCHs.

If the starting point of the scheduled PUSCH is aligned with a u-FFP boundary (S302), the following applies:

If the scheduled PUSCH is also overlapped with a g-FFP and is ended before an idle period of the g-FFP, and the UE has determined that the gNB has initiated the g-FFP based on detection of a DL signal or a DL channel (S303), the UE assumes that the PUSCH transmission is based on sharing the gNB-initiated COT (S304).

Otherwise, the UE assumes the PUSCH transmission is based on a UE-initiated COT (S305).

If the starting point of the scheduled PUSCH is not aligned with the u-FFP boundary (S302), the following applies:

If the scheduled PUSCH is also overlapped with a later g-FFP and is ended before the idle period of the g-FFP and the UE determines that the gNB has initiated the g-FFP based on detection of a DL signal or a DL channel (S306), the UE assumes the PUSCH transmission for the scheduled PUSCH is based on sharing the gNB-initiated COT (S304).

If the condition in S306 is not satisfied and the UE has initiated a u-FFP (S307), the UE assumes that the PUSCH transmission is based on a UE-initiated COT (S305).

Otherwise, the UE cancels the PUSCH transmission for the scheduled PUSCH (S308).

Embodiment 8: (Preconfigured Rules for Determination of a COT Initiator for Cross-FFP DL Scheduling)

In the description, PDSCH scheduled for PDSCH transmission may comprise one or more PDSCH s. If PDSCH is cross-FFP scheduled by DCI or the location of the PDSCH is not confined before an idle period of a g-FFP that carries the scheduling DCI or is ended at the later g-FFP, the following applies.

Whether transmission of the scheduled PDSCH is based on sharing a UE-initiated COT or a gNB-initiated COT can be implicitly determined according to at least one of the following channel access rules:

Rule 1: A UE (e.g., the UE 10) assumes PDSCH transmission of the scheduled PDSCH is based on sharing a UE-initiated COT if the scheduled PDSCH is overlapped with the idle period of the g-FFP that carries the scheduling DCI or is ended at the later g-FFP that covers the scheduled PDSCH.

Rule 2: If the starting point of the cross-FFP scheduled PDSCH is aligned with a g-FFP boundary, the COT type can be determined based on at least one of following schemes:

Scheme 1: The UE assumes the PDSCH transmission of the scheduled PDSCH is based on a gNB-initiated COT.

Scheme 2: If the scheduled PDSCH also overlaps with a u-FFP and is ended before an idle period of the u-FFP, and the UE has initiated a COT in the u-FFP, the UE assumes the PDSCH transmission is based on sharing a UE-initiated COT. Otherwise, the UE assumes the PDSCH transmission is based on a gNB-initiated COT.

Rule 3: If the starting point of the cross-FFP scheduled PDSCH is not aligned with a g-FFP boundary, the COT type can be determined based on following schemes:

Scheme 1: The UE assumes the PDSCH transmission is based on sharing UE-initiated COT.

Scheme 2: Two conditions are used. If the scheduled PDSCH is also overlapped with a u-FFP and is ended before the idle period of the u-FFP, and the UE has initiated a COT in the u-FFP (i.e., the first condition), the UE assumes the PDSCH transmission is based on sharing a UE-initiated COT. Otherwise, if the UE determines that the gNB has initiated a g-FFP based on DL signal/channel detection at the beginning of g-FFP that covers the scheduled PDSCH (i.e., the second condition), the UE assumes that the PDSCH transmission is based on a gNB-initiated COT. If both of above conditions cannot be met, the UE assumes the PDSCH transmission of the scheduled PDSCH is cancelled.

Scheme 3: Two conditions are used. If the UE determines that the gNB has initiated a g-FFP based on the DL signal/channel detection at the beginning of the g-FFP that covers the scheduled PDSCH (i.e., the first condition), the UE assumes that the PDSCH transmission is based on a gNB-initiated COT. Otherwise, if the scheduled PDSCH is also overlapped with a u-FFP and is ended before an idle period of the u-FFP, and the UE has initiated a COT in the u-FFP (i.e., the second condition), the UE assumes the PDSCH transmission is based on sharing the UE-initiated COT. If both of above conditions cannot be met, the UE assumes the scheduled PDSCH transmission is cancelled.

Thus, in an embodiment, the UE may derive the COT initiator based on whether an initial point of the scheduled DL data is aligned with a boundary of the second FFP.

Thus, in an embodiment, the derived COT initiator is the base station. The transmission condition for the base station comprises that the initial point of the scheduled DL data is aligned with a boundary of the second FFP and the base station successfully initiates the COT in the second FFP based on a channel access scheme. The reception condition for the UE comprises that the initial point of the scheduled DL data is aligned with a boundary of the second FFP and the base station successfully initiates the COT in the second FFP based on a channel access scheme.

Alternatively, when the COT initiator is the base station and when the initial point of the scheduled DL data is not aligned with a boundary of the second FFP, the transmission condition for the base station comprises that the base station initiates the COT in the second FFP and the base station successfully accesses the COT based on a channel access scheme. The reception condition for the UE comprises that the base station initiates the COT in the second FFP and the base station successfully accesses the COT based on a channel access scheme.

In an embodiment, when the initial point of the scheduled DL data is aligned with the boundary of the second FFP, the derived COT initiator is the base station. The transmission condition for the base station comprises that the base station successfully initiates the COT in the second FFP based on a channel access scheme. The reception condition for the UE comprises that the base station successfully initiates the COT in the second FFP based on a channel access scheme.

In an embodiment, when the initial point of the scheduled DL data is not aligned with the boundary of the second FFP, the COT initiator is the UE if the UE has successfully initiated the COT in an FFP associated with the UE and the initiated COT covers the scheduled DL data. The transmission condition for the base station comprises that the base station successfully shares the COT initiated by the UE based on a channel access scheme. The reception condition for the UE comprises that the base station successfully shares the COT initiated by the UE based on a channel access scheme.

In an embodiment, when the initial point of the scheduled DL data is not aligned with the boundary of the second FFP, the derived COT initiator is the base station if the base station has initiated the COT in the second FFP. The transmission condition for the base station comprises that the base station successfully accesses the COT initiated by the base station based on a channel access scheme. The reception condition for the UE comprises that the base station successfully accesses the COT initiated by the base station based on a channel access scheme.

Embodiment 8-1: (an Example Procedure Using Preconfigured Rules for Determination of a COT Initiator for Cross-FFP DL Scheduling)

Figure 9:
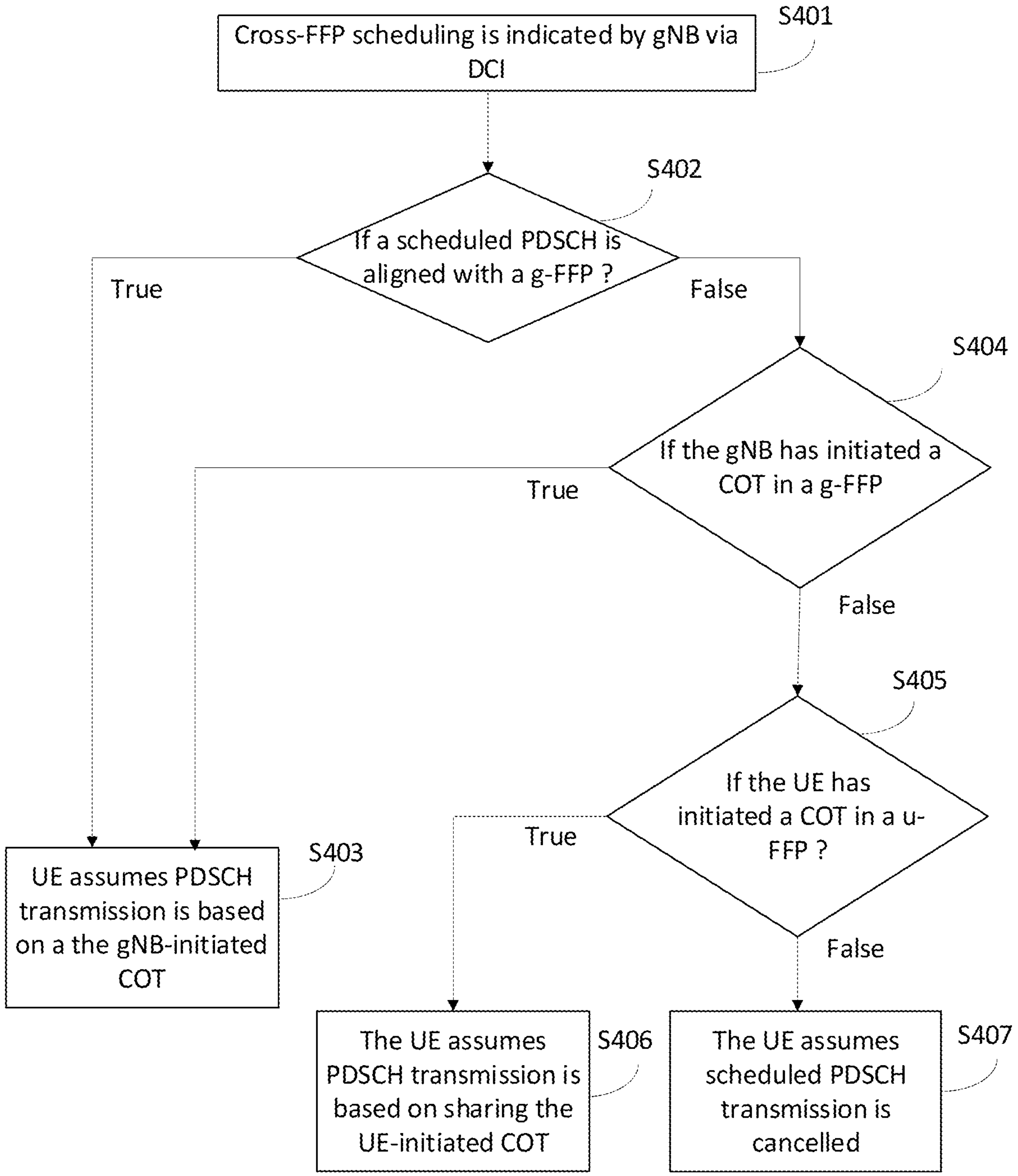
FIG. 9 illustrates a schematic view showing an example of using preconfigured rules to determine a COT initiator for cross-FFP DL scheduling.

With reference to FIG. 9, PDSCH is cross-FFP scheduled based on an indication in DCI received by a UE (e.g., the UE 10) (S401). In the description, PDSCH scheduled for PDSCH transmission may comprise one or more PDSCHs.

If the starting point of the scheduled PDSCH is aligned with a g-FFP boundary (S402), the following applies:

The UE assumes the PDSCH transmission is based on a gNB-initiated COT (S403).

If the starting point of the scheduled PDSCH is not aligned with the g-FFP boundary (S402), the following applies:

If the scheduled PDSCH is overlapped with a later g-FFP and is ended before the idle period of the later g-FFP and the UE has determined the gNB has initiated the g-FFP (S404), the UE assumes the PDSCH transmission is based on a gNB-initiated COT (S403).

If the condition in S404 is not satisfied and the UE has already initiated a u-FFP (S405), the UE assumes that the PDSCH transmission is based on sharing the UE-initiated COT (S406).

Otherwise, the PDSCH transmission of the scheduled PDSCH is cancelled by the base station (S407).

Embodiment 9: (Cross-FFP UL Scheduling Cancellation)

For cross-FFP UL scheduling in a semi-static channel access mode, in a period from the end of physical downlink control channel (PDCCH) that schedules PUSCH during an earlier g-FFP to the start of the scheduled PUSCH during a later g-FFP, the following applies:

If the UE receives a dynamic UL cancellation indication (CI) intended for the scheduled PUSCH or receives a time division duplexing (TDD) UL/DL configuration or slot format indication (SFI) to indicate that slot format of the scheduled PUSCH is not UL, no matter the COT type is UE-initiated COT or gNB-initiated COT, the UE cancels the transmission of the scheduled PUSCH.

Thus, in an embodiment, the transmission condition for the UE comprises that slot format of each of the one or more slots for the scheduled at least one portion of the UL data is a UL slot. The transmission condition for the UE comprises that slot format of each of the one or more slots for the scheduled at least one portion of the UL data is a UL slot. The reception condition for the base station comprises that slot format of each of the one or more slots for the scheduled at least one portion of the UL data is a UL slot.

Embodiment 10: (Cross-FFP DL Scheduling Cancellation)

For cross-FFP DL scheduling in a semi-static channel access mode, in a period from the end of PDCCH that schedules PDSCH during an earlier g-FFP to the start of the scheduled PDSCH during a later g-FFP, the following applies:

If the UE receives a dynamic DL pre-emption indication (PI) intended for the scheduled PDSCH or receives a TDD UL/DL configuration or slot format indication (SFI) to indicate that slot format of the scheduled PDSCH is not DL, no matter the COT type is UE-initiated COT or gNB-initiated COT, the UE assumes the scheduled PDSCH is not transmitted.

Thus, in an embodiment, the transmission condition for the base station comprises that slot format of each of the one or more slots for the scheduled at least one portion of the DL data is a DL slot. The reception condition for the UE comprises that slot format of each of the one or more slots for the scheduled at least one portion of the DL data is a DL slot.

Embodiment 11: (Cross-FFP UL Scheduling with the Same COT Type or Different COT Types)

For cross-FFP UL scheduling in a semi-static channel access mode, the following applies. Since a region of a u-FFP can overlap with a region of a g-FFP, the COT that carries the scheduled PUSCH transmitted by a UE (e.g., the UE 10) can be a UE-initiated COT in the u-FFP or a gNB-initiated COT in the g-FFP.

For cross-FFP UL scheduling in a semi-static channel access mode, the following applies. Since a region of a u-FFP can overlap with a region of a g-FFP, the COT that carries the scheduled PUSCH transmitted by a UE (e.g., the UE 10) can be a UE-initiated COT in the u-FFP or a gNB-initiated COT in the g-FFP.

Figure 10:
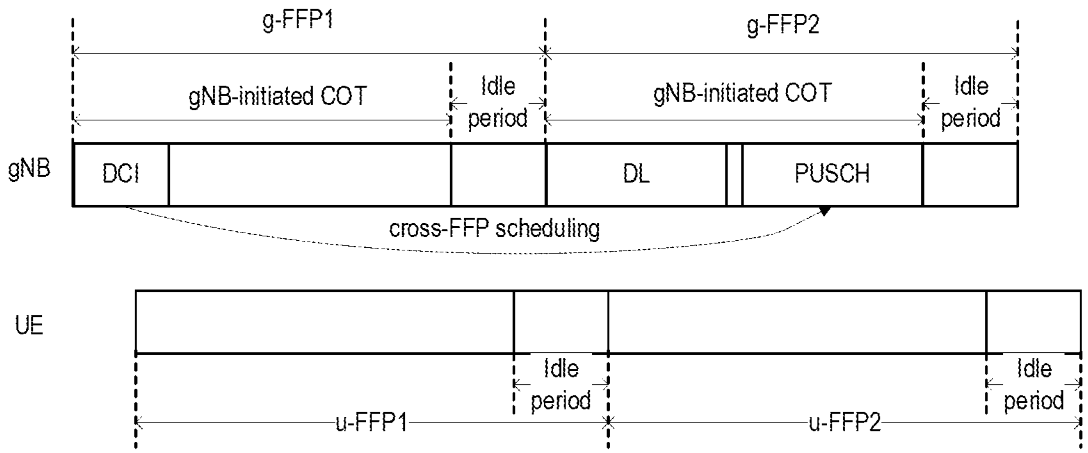
FIG. 10 illustrates a schematic view showing an example of cross-FFP UL scheduling where downlink control information (DCI) in a g-FFP schedules PUSCH in a later g-FFP.

The cross-FFP UL scheduling may include one of the following scheduling schemes:

With reference to FIG. 10, a gNB (e.g., the gNB 20) performs cross-FFP scheduling using DCI in a source g-FFP (e.g., g-FFP1 initiated by the gNB) to schedule PUSCH to be transmitted by a UE (e.g., the UE 10) in a later g-FFP (e.g., g-FFP2 initiated by the gNB).

Figure 11:
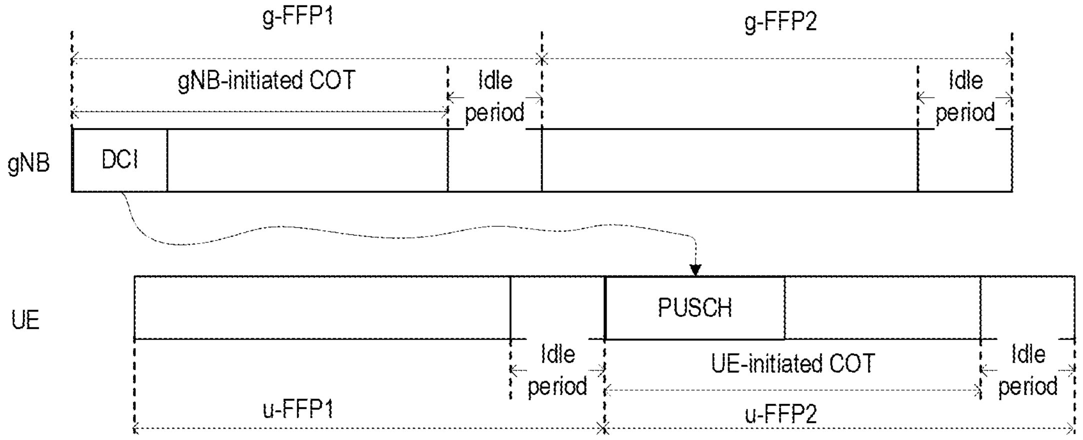
FIG. 11 illustrates a schematic view showing an example of cross-FFP UL scheduling where DCI in a g-FFP schedules PUSCH in a later u-FFP.

With reference to FIG. 11, a gNB (e.g., the gNB 20) performs cross-FFP scheduling using DCI in a source g-FFP (e.g., g-FFP1 initiated by the gNB) to schedule PUSCH to be transmitted by a UE (e.g., the UE 10) in a later u-FFP (e.g., u-FFP2 initiated by the UE).

Figure 12:
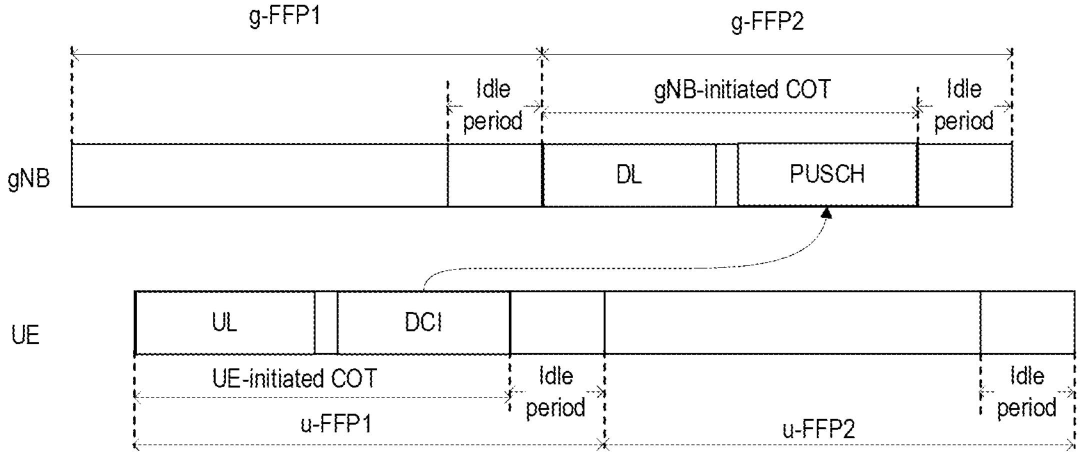
FIG. 12 illustrates a schematic view showing an example of cross-FFP UL scheduling where DCI in a u-FFP scheduling PUSCH in a later g-FFP.

With reference to FIG. 12, a gNB (e.g., the gNB 20) performs cross-FFP scheduling using DCI in a source u-FFP (e.g., u-FFP1 initiated by the UE) to schedule PUSCH to be transmitted by a UE (e.g., the UE 10) in a later g-FFP (e.g., g-FFP2 initiated by the gNB).

Figure 13:
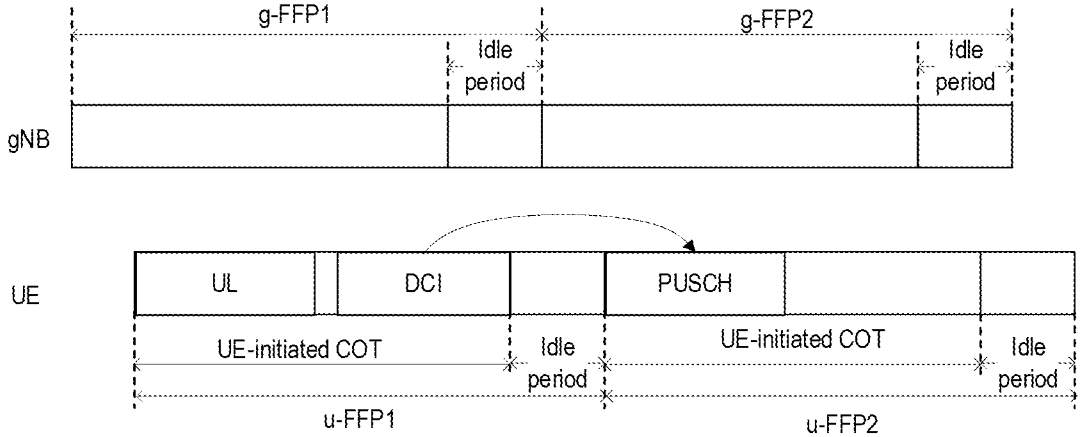
FIG. 13 illustrates a schematic view showing an example of cross-FFP UL scheduling where DCI in a u-FFP scheduling PUSCH in a later u-FFP.

With reference to FIG. 13, a gNB (e.g., the gNB 20) performs cross-FFP scheduling using DCI in a source u-FFP (e.g., u-FFP1 initiated by the UE) to schedule PUSCH to be transmitted by a UE (e.g., the UE 10) in a later u-FFP (e.g., u-FFP2 initiated by the UE).

Thus, in some embodiments, a COT initiator of a COT within the region of the first FFP carrying the DCI may be the base station or the UE. The first FFP and the second FFP belong to different FFPs of the base station.

Embodiment 12: (Cross-FFP DL Scheduling with the Same COT Type or Different COT Types)

For cross-FFP DL scheduling in a semi-static channel access mode, the following applies. Since a region of a u-FFP can overlap with a region of a g-FFP, the COT that carries the scheduling DCI transmitted by the gNB can be a gNB-initiated COT in the g-FFP or a UE-initiated COT in the u-FFP.

For cross-FFP DL scheduling in a semi-static channel access mode, the following applies. Since a region of a u-FFP can overlap with a region of a g-FFP, the COT that carries the scheduled PDSCH transmitted by a UE (e.g., the UE 10) can be a UE-initiated COT in the u-FFP or a gNB-initiated COT in the g-FFP.

Figure 14:
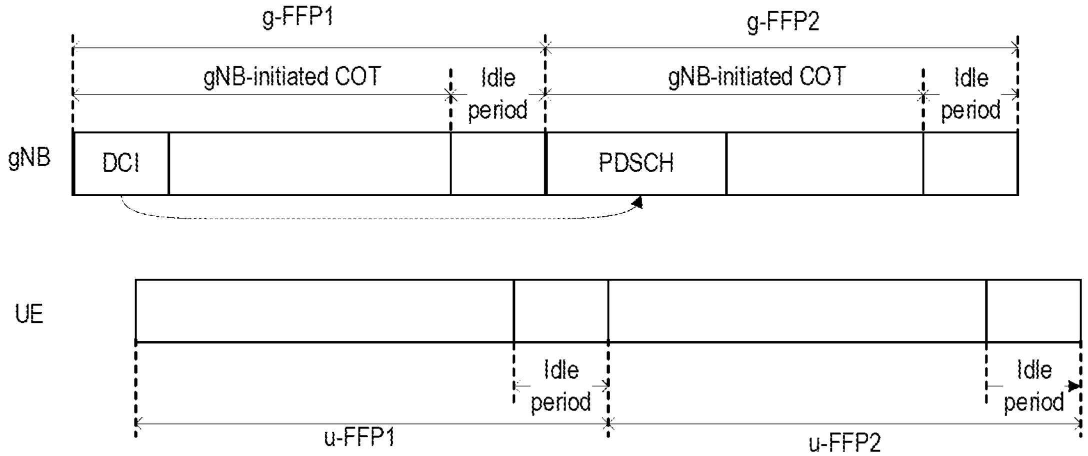
FIG. 14 illustrates a schematic view showing an example of cross-FFP DL scheduling where DCI in a g-FFP schedules PDSCH in a later g-FFP.

The cross-FFP DL scheduling may include one of the following scheduling schemes:

With reference to FIG. 14, a gNB (e.g., the gNB 20) performs cross-FFP scheduling using DCI in a source g-FFP (e.g., g-FFP1 initiated by the gNB) to schedule PDSCH to be received by a UE (e.g., the UE 10) in a later g-FFP (e.g., g-FFP2 initiated by the gNB).

Figure 15:
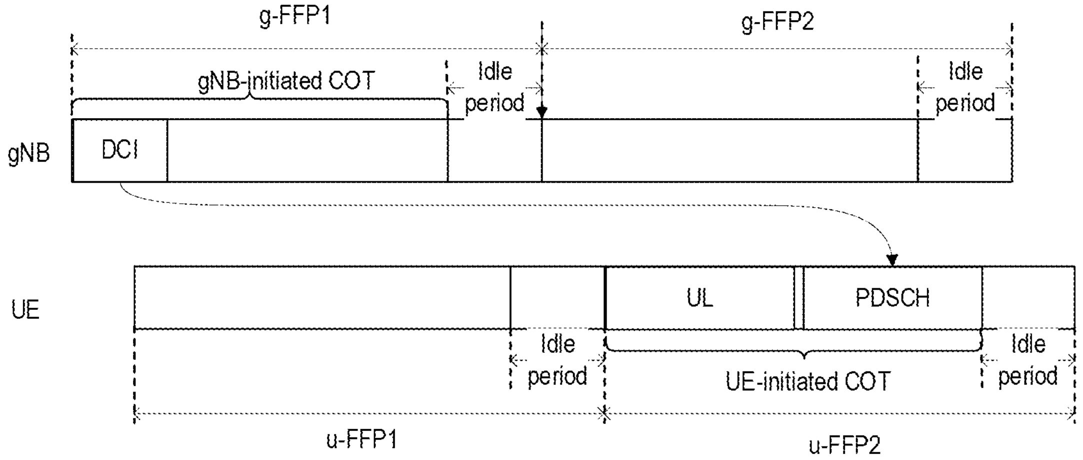
FIG. 15 illustrates a schematic view showing an example of cross-FFP DL scheduling where DCI in a g-FFP schedules PDSCH in a later u-FFP.

With reference to FIG. 15, a gNB (e.g., the gNB 20) performs cross-FFP scheduling using DCI in a source g-FFP (e.g., g-FFP1 initiated by the gNB) to schedule PDSCH to be received by a UE (e.g., the UE 10) in a later u-FFP (e.g., u-FFP2 initiated by the UE).

Figure 16:
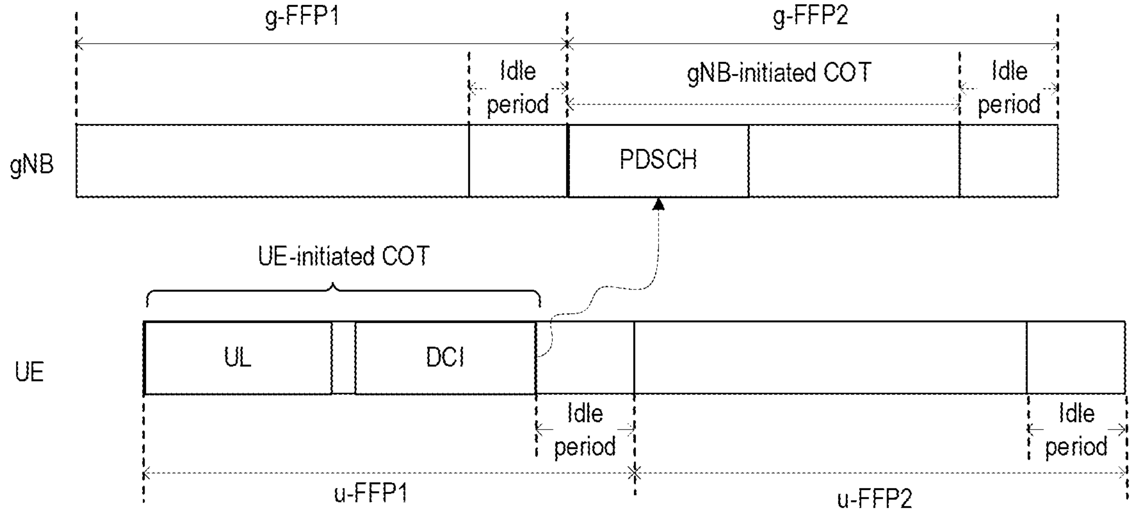

With reference to FIG. 16, a gNB (e.g., the gNB 20) performs cross-FFP scheduling using DCI in a source u-FFP (e.g., u-FFP1 initiated by the UE) to schedule PDSCH to be received by a UE (e.g., the UE 10) in a later g-FFP (e.g., g-FFP2 initiated by the gNB).

Figure 17:
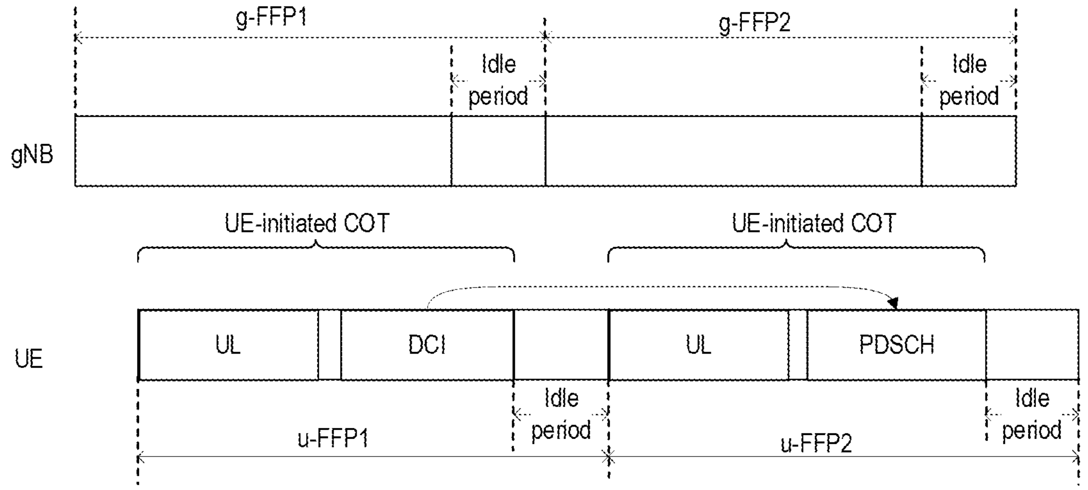

With reference to FIG. 17, a gNB (e.g., the gNB 20) performs cross-FFP scheduling using DCI in a source u-FFP (e.g., u-FFP1 initiated by the UE) to schedule PDSCH to be received by a UE (e.g., the UE 10) in a later u-FFP (e.g., u-FFP2 initiated by the UE).

Thus, in some embodiments, a COT initiator of a COT within the region of the first FFP carrying the DCI may be the base station or the UE. The first FFP and the second FFP belong to different FFPs of the base station.

Embodiment 13: (DCI Indication for PUSCH)

In a semi-static channel access mode, if a UE (e.g., the UE 10) is scheduled for dynamic PUSCH transmission, and is configured with an energy detection (ED) threshold and a UE's maximum transmission power by a gNB (e.g., the gNB 20) via dedicated radio resource control (RRC) singling. The UE can use the ED to determine whether an unlicensed band channel is occupied or idle.

In some embodiments, at least one of the following parameters is carried in DCI and configured for scheduled PUSCH transmission of the scheduled PUSCH.

A parameter indicating whether the scheduled PUSCH transmission is based on a UE-initiated COT or sharing a gNB-initiated COT.

A parameter indicating intra-FFP or inter-FFP (cross-FFP) scheduling. For example, a g-FFP location of scheduled PUSCH is indicated based on an offset value relative to a g-FFP that carries scheduling DCI that schedules the scheduled PUSCH. Granularity of the offset value may be one g-FFP period or length of a slot.

Thus, in an embodiment, the COT initiator derived based on the indication in the DCI is jointly encoded with a channel access scheme in a bitfield of the DCI.

If the scheduled UL transmission is based on sharing a gNB-initiated COT, the following parameters can be further provided in the scheduling DCI:

A parameter indicating a channel access scheme for semi-static channel access. The channel access scheme indicated in the parameter may comprise one of more of the following:

A parameter indicating whether to performing channel sensing or not based on an indicated LBT type, depends on if a transmission gap is larger than or smaller than 16 us respectively; and A length of cyclic prefix (CP) extension.

If the scheduled UL transmission is based on a UE-initiated COT, the gNB can further indicate the UE at least one of the following:

A u-FFP periodicity and a u-FFP offset; and

Whether ED threshold for clear channel assessment (CCA) is based on a gNB configured ED threshold or is based on an ED threshold calculated from the UE's maximum transmission power.

Any combination of the aforementioned parameters can be partially or jointly encoded into a bitfield in scheduling DCI.

The bitfield can indicate one set of at least one of the aforementioned parameters preconfigured by the gNB, where each set of parameters can include a combination of at least one of the aforementioned parameters.

The bitfield can be a row index in a look up table to indicate one set of parameters in a look up table, wherein each parameter corresponds to a column index in the look up table.

Candidate values for parameters of corresponding columns in each row in the look up table can be preconfigured by the gNB via RRC signalling.

Default values for parameters of corresponding columns in each row in the look up table can be specified in the standard for UE not entering RRC_CONNECTED state.

The bitfield can be indicated in DCI format 0_0, 0_1, or 0_2. Thus, in an embodiment, a DCI format used for indicating the COT initiator may include DCI format 0_0, 0_1, or 0_2.

A bit length of the bitfield can be configured in the DCI format 0_1 and/or 0_2.

Figure 18:
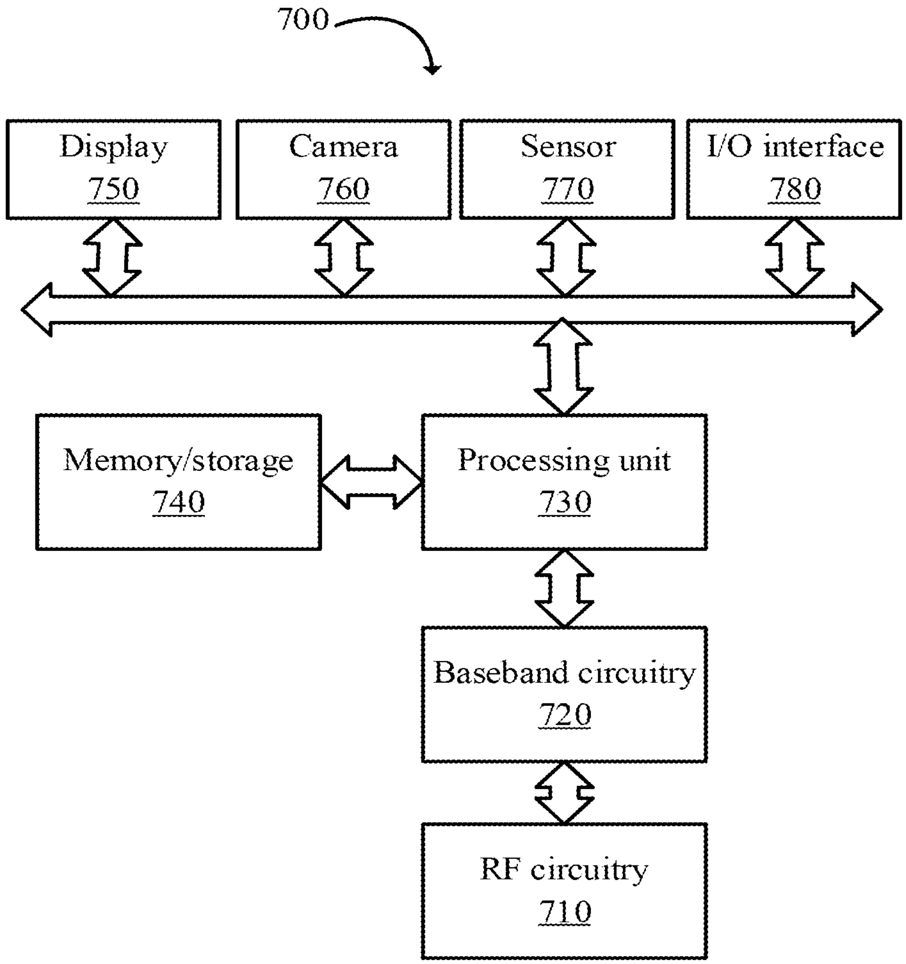
FIG. 18 illustrates a schematic view showing a system for wireless communication according to an embodiment of the present disclosure.

FIG. 18 is a block diagram of an example system 700 for wireless communication according to an embodiment of the present disclosure. Embodiments described herein may be implemented into the system using any suitably configured hardware and/or software. FIG. 18 illustrates the system 700 including a radio frequency (RF) circuitry 710, a baseband circuitry 720, a processing unit 730, a memory/storage 740, a display 750, a camera 760, a sensor 770, and an input/output (I/O) interface 780, coupled with each other as illustrated.

The processing unit 730 may include circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with 5G NR, LTE, an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the UE, eNB, or gNB may be embodied in whole or in part in one or more of the RF circuitries, the baseband circuitry, and/or the processing unit. As used herein, "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the processing unit, and/or the memory/storage may be implemented together on a system on a chip (SOC).

The memory/storage 740 may be used to load and store data and/or instructions, for example, for the system. The memory/storage for one embodiment may include any combination of suitable volatile memory, such as dynamic random access memory (DRAM)), and/or non-volatile memory, such as flash memory. In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite. In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, the system may have more or less components, and/or different architectures. Where appropriate, the methods described herein may be implemented as a computer program. The computer program may be stored on a storage medium, such as a non-transitory storage medium.

The embodiment of the present disclosure is a combination of techniques/processes that may be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of the application and design requirement for a technical plan. A person having ordinary skills in the art may use different ways to realize the function for each specific application while such realizations should not go beyond the scope of the present disclosure. It is understood by a person having ordinary skill in the art that he/she may refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure may be realized in other ways. The above-mentioned embodiments are exemplary only. The division of the units is merely based on logical functions while other divisions exist in realization. It is possible that a plurality of units or components are combined or integrated into another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments may be integrated into one processing unit, physically independent, or integrated into one processing unit with two or more than two units.

If the software function unit is realized and used and sold as a product, it may be stored in a readable storage medium in a computer. Based on this understanding, the technical plan proposed by the present disclosure may be essentially or partially realized as the form of a software product. Or, one part of the technical plan beneficial to the conventional technology may be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

At least one embodiment of the disclosed method provides procedures and schemes to support cross-FFP DL scheduling, wherein a COT for DCI that schedules physical downlink shared channel (PDSCH) and a COT for PDSCH transmission can be gNB-initiated or UE-initiated.

At least one embodiment of the disclosed method provides procedures and schemes to support cross-FFP UL scheduling, wherein a COT for DCI that schedules PUSCH and a COT for PUSCH transmission can be gNB-initiated or UE-initiated.

Embodiments of the disclosure provide useful technical effects of improving scheduling flexibility for semi-static channel access.

A base station simultaneously scheduling physical downlink shared channel (PDSCH) and/or physical uplink shared channel (PUSCH) in a current FFP and a next FFP can enhance the efficiency of radio resource utilization.

When the location of the scheduling DCI is at the end of a current FFP, a UE-initiated COT in the next FFP can reduce transmission latency.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A channel access method in an unlicensed band, executable by a user equipment (UE) comprising:

receiving from a base station a downlink control information (DCI) within a region of a first fixed frame period (FFP), wherein the DCI is used to schedule downlink (DL) data within a region of a second FFP;

deriving a channel occupancy time (COT) initiator associated with a COT within the region of the second FFP; and receiving the scheduled DL data in the COT initiated by the derived initiator according to a reception condition.

2. The channel access method of claim 1, wherein both the first FFP and the second FFP are associated with an FFP parameter of the base station.

3. The channel access method of claim 2, wherein the UE derives the COT initiator based on an indication in a DCI for scheduling an UL transmission.

4. The channel access method of claim 2, wherein the derived COT initiator is the UE; and the reception condition comprises that the UE has initiated the COT in an FFP associated with the UE.

5. The channel access method of claim 4, wherein the reception condition further comprises the base station successfully shares the COT initiated by the UE based on a channel access scheme.

6. The channel access method of claim 4, wherein sharing information of the COT initiated by the UE is provided to the base station.

7. The channel access method of claim 2, wherein the UE derives the COT initiator based on whether an initial point of the scheduled DL data is aligned with a boundary of the second FFP.

8. The channel access method of claim 7, wherein when the initial point of the scheduled DL data is aligned with the boundary of the second FFP, the derived COT initiator is the base station; and the reception condition comprises that the base station successfully initiates the COT in the second FFP based on a channel access scheme.

9. The channel access method of claim 7, wherein when the initial point of the scheduled DL data is not aligned with the boundary of the second FFP, the COT initiator is the UE when the UE has successfully initiated the COT in an FFP associated with the UE and the initiated COT covers the scheduled DL data; and the reception condition comprises that the base station successfully shares the COT initiated by the UE based on a channel access scheme.

10. The channel access method of claim 7, wherein when the initial point of the scheduled DL data is not aligned with the boundary of the second FFP, the derived COT initiator is the base station when the base station has initiated the COT in the second FFP; and the reception condition comprises that the base station successfully accesses the COT initiated by the base station based on a channel access scheme.

11. The channel access method of claim 2, wherein the scheduled DL data comprises a plurality of physical downlink shared channels (PDSCHs), the plurality of PDSCHs are transmitted in one or more FFPs starting from the second FFP, and the plurality of PDSCHs carry PDSCH repetitions of a single transport block (TB) or carry different TBs, wherein the derived COT initiator is applied to the plurality of PDSCHs.

12. The channel access method of claim 2, wherein a COT initiator of a COT within the region of the first FFP for receiving the DCI is the UE.

13. A channel access method in an unlicensed band, executable by a base station comprising:

transmitting from the base station a downlink control information (DCI) within a region of a first fixed frame period (FFP), wherein the DCI is used to schedule downlink (DL) data within a region of a second FFP; and transmitting the scheduled DL data in a channel occupancy time (COT) associated with a COT initiator within the region of the second FFP according to a transmission condition, wherein both the first FFP and the second FFP are associated with an FFP parameter of the base station.

14. The channel access method of claim 13, wherein the COT initiator is indicated in a DCI for scheduling an UL transmission.

15. The channel access method of claim 13, wherein the COT initiator is a user equipment (UE); and the transmission condition comprises that the base station determines the UE has initiated the COT in an FFP associated with the UE and the base station successfully shares the COT initiated by the UE based on a channel access scheme.

16. The channel access method of claim 15, wherein sharing information of a UE-initiated COT is received by the base station.

17. The channel access method of claim 13, wherein when an initial point of the scheduled DL data is aligned with the boundary of the second FFP, the COT initiator is the base station;

and the transmission condition comprises that the base station successfully initiates the COT in the second FFP based on a channel access scheme.

18. The channel access method of claim 13, wherein when an initial point of the scheduled DL data is not aligned with the boundary of the second FFP, the COT initiator is a user equipment (UE) when the base station determines the UE has initiated the COT in an FFP associated with the UE and the COT initiated by the UE covers the scheduled DL data; and the transmission condition comprises that the base station successfully shares the COT initiated by the UE based on a channel access scheme.

19. The channel access method of claim 13, wherein when an initial point of the scheduled DL data is not aligned with the boundary of the second FFP, the COT initiator is the base station when the base station has initiated the COT in the second FFP; and the transmission condition comprises that the base station successfully accesses the COT initiated by the base station based on a channel access scheme.

20. The channel access method of claim 13, wherein the scheduled DL data comprises a plurality of physical downlink shared channels (PDSCHs), the plurality of PDSCHs are transmitted in one or more FFPs starting from the second FFP, and the plurality of PDSCHs carry PDSCH repetitions of a single transport block (TB) or carry different TBs, wherein same COT initiator is applied to the plurality of PDSCHs.

* * * * *